(12) United States Patent
Ling

(10) Patent No.: US 10,920,865 B2
(45) Date of Patent: Feb. 16, 2021

(54) DIFFERENTIAL AND CYCLOIDAL DIFFERENTIAL

(71) Applicant: Zilong Ling, Shenzhen (CN)

(72) Inventor: Zilong Ling, Shenzhen (CN)

(73) Assignee: Zilong Ling, Shenzhen (CN)

( * ) Notice: Subject to any disclaimer, the term of this patent is extended or adjusted under 35 U.S.C. 154(b) by 0 days.

(21) Appl. No.: 16/496,891

(22) PCT Filed: Mar. 31, 2018

(86) PCT No.: PCT/CN2018/081481
§ 371 (c)(1),
(2) Date: Sep. 23, 2019

(87) PCT Pub. No.: WO2018/184506
PCT Pub. Date: Oct. 11, 2018

(65) Prior Publication Data
US 2020/0096086 A1 Mar. 26, 2020

(30) Foreign Application Priority Data

Apr. 2, 2017 (CN) .......................... 2017 1 0215093
Apr. 2, 2017 (CN) .......................... 2017 1 0215142
(Continued)

(51) Int. Cl.
*F16H 48/11* (2012.01)
*F16H 57/023* (2012.01)
(Continued)

(52) U.S. Cl.
CPC .......... *F16H 48/11* (2013.01); *F16H 57/023* (2013.01); *F16H 57/037* (2013.01); *F16H 57/082* (2013.01); *F16H 2057/02043* (2013.01)

(58) Field of Classification Search
None
See application file for complete search history.

(56) References Cited

U.S. PATENT DOCUMENTS 7,217,212 B2 * 5/2007 Fanselow ................ F16H 48/10
475/174
10,359,099 B1 * 7/2019 Gardner .................. F16H 48/06

FOREIGN PATENT DOCUMENTS

| CN | 2267354 Y | 11/1997 |
| CN | 201651218 U | 11/2010 |

(Continued)

OTHER PUBLICATIONS

International search report of PCT/CN2018/081481.
Written opinion of PCT/CN2018/081481.

*Primary Examiner* — Dirk Wright
(74) *Attorney, Agent, or Firm* — Dragon Sun Law Firm, PC; Jinggao Li, Esq.

(57) ABSTRACT

A differential includes a housing, an internal gear pair having an oscillating gear A and an output gear A, an internal gear pair consisting of an oscillating gear B and an output gear B, at least two A-type intermediate gears, and at least two B-type intermediate gears. Each A-type intermediate gear is radially fixed to the housing, and an axis of rotation of each A-type intermediate gear is parallel to an axis of rotation of the housing. Each A-type intermediate gear is meshed with at least one B-type intermediate gear, and the gear ratio of each gear pair consisting of an A-type intermediate gear and a B-type intermediate gear is the same. Each A-type intermediate gear includes an eccentric shaft having an axis parallel to its axis of rotation, and the eccentric shaft on each A-type intermediate gear has the same distance from the axis of rotation of the gear.

20 Claims, 15 Drawing Sheets

(30) Foreign Application Priority Data

Apr. 7, 2017 (CN) .......................... 2017 1 0223642
Apr. 7, 2017 (CN) .......................... 2017 1 0224954
Apr. 7, 2017 (CN) .......................... 2017 1 0225518

(51) Int. Cl.
*F16H 57/037* (2012.01)
*F16H 57/08* (2006.01)
F16H 57/02 (2012.01)

(56) References Cited

FOREIGN PATENT DOCUMENTS

| | | | |
|---|---|---|---|
| CN | 106801736 | A | 6/2017 |
| CN | 106838198 | A | 6/2017 |
| CN | 106838202 | A | 6/2017 |
| CN | 107061673 | A | 8/2017 |
| CN | 206754316 | U | 12/2017 |
| CN | 206785966 | U | 12/2017 |
| CN | 207111875 | U | 3/2018 |
| CN | 207111876 | U | 3/2018 |
| JP | 2016098943 | A | 5/2016 |

\* cited by examiner

DIFFERENTIAL AND CYCLOIDAL DIFFERENTIAL

CROSS-REFERENCE TO RELATED APPLICATIONS

This application is a national stage application of PCT Application No. PCT/CN2018/081481. This Application claims priority from PCT Application No. PCT/CN2018/081481 filed Mar. 31, 2018, CN Application No. CN 201710215093.3 filed Apr. 2, 2017, CN Application No. CN 201710215142.3 filed Apr. 2, 2017, CN 201710223642.1 filed Apr. 7, 2017, CN 201710224954.4 filed Apr. 7, 2017, and CN 201710225518.9 filed Apr. 7, 2017 the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The present disclosure relates to a differential and in particular to relates to a differential and a cycloidal differential applicable to automobiles, belonging to the technical field of mechanical transmission components.

BACKGROUND OF THE INVENTION

As a mechanical transmission component, the differential is usually used for transmitting the power output by an automobile gearbox to two or four driving wheels. Since the rolling trajectories of the driving wheels are different due to uneven road, vehicle turning and the like, and if the rotation at the same speed is maintained, the friction between the wheels and the road surface will be increased and the driving resistance of the vehicle will also be increased. Therefore, the differential outputs a rotation speed to each wheel according to different operation conditions of each driving wheel. Most of conventional differentials are of a helical gear or crown gear structure.

The limited slip differential is called LSD for short. As the name implies, the LSD is an improved differential for limiting the slippage of wheels, i.e., a differential for allowing the difference in rotation speed between driving wheels to be within a certain range to ensure normal driving performances such as turning. However, when a certain driving wheel slips or suspends, the limited slip differential will not output all power to the slipped or suspended wheel, so that it is helpful for the vehicle to suppress wheel slipping and the manipulation during violent driving. For example, when a wheel of a vehicle falls into a pit, this wheel has no any friction, and the landing wheels have a great resistance. In this case, an ordinary differential will make all the power return to the low-friction wheel. Thus, the wheel falling into the pit will rotate ceaselessly, while the landing wheels will not move at all, so that the wheels cannot run. At this time, if the vehicle is equipped with a limited slip differential, this situation may be avoided. For existing limited slip differentials, locking may be realized by an electrically controlled multi-plate clutch, but the response speed is relatively low; and, locking may also be realized by purely mechanical worm and gear, but the manufacturing cost is relatively high, and it is inconvenient to set the distribution of the output torque on front and rear wheels when the limited slip differential is used as a central differential.

SUMMARY OF THE INVENTION

The present disclosure provides a differential and a cycloidal differential. The specific technical solutions will be described below.

A differential is provided, including a housing, an internal gear pair consisting of an oscillating gear A and an output gear A, an internal gear pair consisting of an oscillating gear B and an output gear B, at least two A-type intermediate gears, and at least two B-type intermediate gears; each A-type intermediate gear is radially fixed to the housing, and an axis of each A-type intermediate gear is parallel to an axis of rotation of the housing; each A-type intermediate gear is meshed with at least one B-type intermediate gear, and the gear ratio of each gear pair consisting of an A-type intermediate gear and a B-type intermediate gear is the same; each A-type intermediate gear is provided with an eccentric shaft having an axis parallel to its axis of rotation, and the eccentric shaft on each A-type intermediate gear has the same distance from the axis of rotation of the gear; the eccentric shafts on all A-type intermediate gears are the same in phase, and the eccentric shaft on each A-type intermediate gear is radially fixed to the oscillating gear A, respectively; the output gear A is coaxial with the axis of rotation of the housing; each B-type intermediate gear is radially fixed to the housing, and an axis of rotation of each B-type intermediate gear is parallel to the axis of rotation of the housing; each B-type intermediate gear is meshed with at least one A-type intermediate gear; each B-type intermediate gear is provided with an eccentric shaft having an axis parallel to its axis of rotation, and the eccentric shaft on each B-type intermediate gear has the same distance from the axis of rotation of the gear; the eccentric shafts on all B-type intermediate gears are the same in phase, and the eccentric shaft on each B-type intermediate gear is radially fixed to the oscillating gear B, respectively; and, the output gear B is coaxial with the axis of rotation of the housing.

The descriptions defined by the above-mentioned spatial positional relationship are a more rigorous description method for defining the direct or indirect connection and contact among components. A person of ordinary skill in the art can understand the connection relationship among components and the overall structure of the technical solutions of the present disclosure according to the descriptions of the spatial positional relationship. The housing may be a component or a member consisting of a plurality of components. The housing member does not necessarily completely enclose all components as long as the above components satisfy the spatial positional relationship and the mechanical connection relationship. The more exact spatial relationship of the radial fixation of the A-type intermediate gears and the B-type intermediate gears relative to the housing is explained as follows: the axis of rotation of each intermediate gear is fixed at a point on a radial cross-section of the housing, or the axis of rotation is limited in a small fixed region on the radial cross-section of the housing since a bearing or lubricating oil needs to be arranged between the intermediate gear and the housing to reverse a clearance for rotation. The relationship between the housing and all the intermediate gears can also be interpreted as a relationship between a planet carrier and planet gears. The radial fixation relationship between the oscillating gear A and the eccentric shafts of all the A-type intermediate gears also conforms to the above description, and the radial fixation relationship between the oscillating gear B and the eccentric shafts of all the B-type intermediate gears also conforms to the above description. The A-type intermediate gears and the B-type intermediate gears may be identical gears, or may be gears that have a different number of teeth and can form an external gear pair. The above spatial positional relationship in which the eccentric shafts on all the A-type intermediate gears are the same in phase can be interpreted as follows: the axis of the eccentric shat of each of any two A-type intermediate gears is always parallel to a plane determined by the axis of rotation of the gear. At a differential speed, the oscillating gear A revolves synchronously with the rotation of each A-type intermediate gear by taking the axis of rotation of the housing as an axis, and the oscillating gear B revolves synchronously with the rotation of each B-type intermediate gear by taking the axis of rotation of the housing as an axis. During the operation of the differential, torque is input from the housing and then output from the output gear A and the output gear B, respectively. Inputting an external force by which structure and outputting the external force by which structure need not be included in the technical solutions of the differential, but the external force is usually output by a gear or a rotation shaft. It is possible that a gear or a spline with a connecting shaft is machined on a component or member of the differential.

In the differential, the housing rotates under an external force so as to drive each A-type intermediate gear and each B-type intermediate gear to revolve about the axis of rotation of the housing along with the housing; the eccentric shaft on each A-type intermediate gear drives the oscillating gear A to rotate with the housing, and the oscillating gear A drives the output gear A to rotate; the eccentric shaft on each B-type intermediate gear drives the oscillating gear B to rotate with the housing, and the oscillating gear B drives the output gear B to rotate; the output gear A and the output gear B output rotation, respectively; when the output gear A and the output gear B are the same in rotation speed, all components in the differential are stationary relative to the housing; when the output gear A and the output gear B are different in rotation speed due to different output loads, the output gear A and the output gear B rotate relative to each other, that is, the output gear A and the output gear B rotate relative to the housing in opposite directions, respectively, so that the oscillating gear A and the oscillating gear B revolve relative to the housing in a direction opposite to the direction of the axis of rotation of the housing; the revolution of the oscillating gear A and the oscillating gear B relative to the axis of rotation of the housing drives each A-type intermediate gear and each B-type intermediate gear to rotate in opposite directions through the eccentric shafts; and, due to the limitation of the meshing of the A-type intermediate gears with the B-type intermediate gears, the output gear A and the output gear B can only rotate in opposite directions relative to the housing at a fixed rotation speed ratio. The principles for implementing the transmission relationship of the rotation motion or the transmission relationship of torque and the differential output in the differential of the present disclosure are described above. The implementation principle of the potential slip limiting mechanism in the differential of the present disclosure is further explained as follows: the number of teeth of the output gear A and the oscillating gear A determines a ratio of the speed of revolution, using the axis of rotation of the housing as an axis, of the oscillating gear A relative to the housing driven by the rotation of the output gear A relative to the housing to the speed of rotation of the output gear A relative to the housing, and the speed of revolution of the oscillating gear A is the same as the speed of rotation of each A-type intermediate gear; and, the number of teeth of the output gear B and the oscillating gear B determines a ratio of the speed of revolution, using the axis of rotation of the housing as an axis, of the oscillating gear B relative to the housing driven by the rotation of the output gear B relative to the housing to the speed of rotation of the output gear B relative to the housing, and the speed of revolution of the oscillating gear B is the same as the speed of rotation of each B-type intermediate gear. When the two ratios are higher, due to the presence of the friction and the hydraulic resistance of the lubricating oil, the load inside the differential during the relative rotation of the output gear A and the output gear B will be enlarged proportionally according to the relative rotation speed. Meanwhile, the load inside the differential also increases the pressure on the meshing surfaces between the output gear A and the oscillating gear A and between the output gear B and the oscillating gear B, so that the transmission resistance of the gear pairs between the output gear A and the oscillating gear A and between the output gear B and the oscillating gear B is increased, and the load of the relative rotation between the output gear A and the output gear B is further increased. The increase in load balances a difference in external output load that causes the difference in rotation speed between the output gear A and the output gear B, so that the output gear A and the output gear B tend to output at the same speed, and the slip limiting effect is thus achieved. Specifically, whether the locking can be realized in case of slipping depends upon the maximum value of the increase in load inside the differential. Theoretically, when the load inside the differential caused by the relative torque or relative rotation speed of the output gear A and the output gear B is greater than or equal to the torque input into the housing, the relative locking between the output gear A and the output gear B can be realized.

A differential is provided, including a housing, an internal gear pair consisting of an oscillating gear A and an output gear A, an internal gear pair consisting of an oscillating gear B and an output gear B, at least two A-type intermediate gears, at least two B-type intermediate gears, and at least two friction plates, wherein each A-type intermediate gear is radially fixed to the housing, and an axis of rotation of each A-type intermediate gear is parallel to an axis of rotation of the housing; each A-type intermediate gear is meshed with at least one B-type intermediate gear, and the gear ratio of each gear pair consisting of an A-type intermediate gear and a B-type intermediate gear is the same; each A-type intermediate gear is provided with an eccentric shaft having an axis parallel to its axis of rotation, and the eccentric shaft on each A-type intermediate gear has the same distance from the axis of rotation of the gear; the eccentric shafts on all A-type intermediate gears are the same in phase, and the eccentric shaft on each A-type intermediate gear is radially fixed to the oscillating gear A, respectively; the output gear A is coaxial with the axis of rotation of the housing; a friction plate is arranged between each A-type intermediate gear and the oscillating gear A or the housing; each B-type intermediate gear is radially fixed to the housing, and an axis of rotation of each B-type intermediate gear is parallel to an axis of rotation of the housing; each B-type intermediate gear is meshed with at least one A-type intermediate gear; each B-type intermediate gear is provided with an eccentric shaft having an axis parallel to its axis of rotation, and the eccentric shaft on each B-type intermediate gear has the same distance from the axis of rotation of the gear; the eccentric shafts on all B-type intermediate gears are the same in phase, and the eccentric shaft on each B-type intermediate gear is radially fixed to the oscillating gear B, respectively; the output gear B is coaxial with the axis of rotation of the housing; and, a friction plate is arranged between each B-type intermediate gear and the oscillating gear B or the housing. The descriptions defined by the above-mentioned spatial positional relationship are a more rigorous description method for defining the direct or indirect connection and contact among components. A person of ordinary skill in the art can understand the connection relationship among components and the overall structure of the technical solutions of the present disclosure according to the descriptions of the spatial positional relationship. The housing may be a component or a member consisting of a plurality of components. The housing member does not necessarily completely enclose all components as long as the above components satisfy the spatial positional relationship and the mechanical connection relationship. The more exact spatial relationship of the radial fixation of the A-type intermediate gears and the B-type intermediate gears relative to the housing is explained as follows: the axis of rotation of each intermediate gear is fixed at a point on a radial cross-section of the housing, or the axis of rotation is limited in a very small fixed region on the radial cross-section of the housing since a bearing or lubricating oil needs to be arranged between the intermediate gear and the housing to reverse a clearance for rotation. The relationship between the housing and all the intermediate gears can also be interpreted as a relationship between a planet carrier and planet gears. The radial fixation relationship between the oscillating gear A and the eccentric shafts of all the A-type intermediate gears also conforms to the above description, and the radial fixation relationship between the oscillating gear B and the eccentric shafts of all the B-type intermediate gears also conforms to the above description. The A-type intermediate gears and the B-type intermediate gears may be identical gears, or may be gears that have a different number of teeth and can form an external gear pair. The above spatial positional relationship in which the eccentric shafts on all the A-type intermediate gears are the same in phase can be interpreted as follows: the axis of the eccentric shat of each of any two A-type intermediate gears is always parallel to a plane determined by the axis of rotation of the gear. At a differential speed, the oscillating gear A revolves synchronously with the rotation of each A-type intermediate gear by taking the axis of rotation of the housing as an axis, and the oscillating gear B revolves synchronously with the rotation of each B-type intermediate gear by taking the axis of rotation of the housing as an axis. During the operation of the differential, torque is input from the housing and then output from the output gear A and the output gear B, respectively. Inputting an external force by which structure and outputting the external force by which structure need not be included in the technical solutions of the differential, but the external force is usually output by a gear or a rotation shaft. It is possible that a gear or a spline with a connecting shaft is machined on a component or member of the differential. The friction plate is a component for increasing the friction between components. The friction plates of the present disclosure are used to increase the rotational friction between the intermediate gears and the oscillating gears so as to realize the slip limiting effect.

The gear pair consisting of the oscillating gear A and the output gear A or the gear pair consisting of the oscillating gear B and the output gear B is a cycloidal gear pair. The cycloidal gear pair includes a cycloidal pin wheel gear pair. When the cycloidal gear pair has a small tooth difference, one rotation of the two gears relative to each other will correspond to multiple revolutions of one gear about the axis of rotation of the other gear, so that the resistance during rotation can be enlarged. Moreover, the cycloidal gear may be a gear with fewer teeth, so the bearing capacity of the gear is increased in a limited space. Additionally, by adjusting the tooth shape of the cycloidal gear, the relationship between the rotational resistance of the gear meshing and the torque load can be adjusted, so that it is more advantageous for implementing differentials with different slip limiting capabilities.

The differential includes at least three A-type intermediate gears and at least three B-type intermediate gears. In more than three A-type intermediate gears and more than three B-type intermediate gears, three eccentric shafts are connected to the oscillating gear A and the oscillating gear B, so it is more advantageous for the stability of the revolution of the gears about the axis of rotation of the housing. The three eccentric shafts are more advantageous for the torque load capability for the rotation of the housing to drive the oscillating gears to synchronously rotate with the housing.

Both the output gear A and the output gear B are external gears. In this case, the rotation of the output gear drives the oscillating gear in the gear pair to revolve in a direction opposite to the direction of rotation of the output gear. At this time, the gear transmission resistance between the output gear and the oscillating gear becomes larger, so it is more advantageously applied to the limited slip differential. Or, after the transmission torque is increased to a certain fixed value, the rational resistance is higher than the input torque, resulting in gear locking to achieve the differential locking effect.

Both the output gear A and the output gear B are internal gears. In this case, the rotation of the output gear drives the oscillating gear in the gear pair to revolve in the same direction as the direction of rotation of the output gear. At this time, the gear transmission resistance between the output gear and the oscillating gear becomes smaller, so it is more advantageous to reduce resistance and torque loss during the differential output of the differential.

Both the A-type intermediate gears and the B-type intermediate gears are helical gears or worms. A gear pair consisting of helical gears can generate an axial stress during the relative rotation. The axial stress is advantageous for increasing the friction pressure between the gear and other axial components, i.e., increasing the resistance of rotation of the gear. The worm is a kind of gear. A gear pair consisting of worms generates an axial stress during the relative rotation. This axial stress increases the friction between the worms in the worm gear pair, so as to increase the resistance of rotation of the worms. Meanwhile, this axial stress is advantageous for increasing the friction pressure between the worms and other axial components, i.e., increasing the resistance of rotation of the worms. After the resistance of rotation of the intermediate gears is increased to a certain fixed value, the resistance causing the meshing rotation of the intermediate gears A and the intermediate gears B will exceed the torque causing the relative rotation of the intermediate gears A and the intermediate gears B, so that the locking of the differential is realized.

The output gear A, the output gear B, the oscillating gear A and the oscillating gear B are axially fixed relative to the housing, respectively. The spatial relationship of the axial fixation relative to the housing is further interpreted as follows: the component along the axial direction of the housing in the spatial positional relationship with the housing remains unchanged; or, since a bearing or lubricating oil needs to be arranged between the rotating component and the housing to reserve a clearance for purpose of the radial or circumferential motion relative to the housing, a component along the axial direction of the housing in the spatial positional relationship between the rotating component and the housing is limited in a relatively small fixation range, which is also a fixation mode. For example, as shown in the figures, the housing limits, from its two ends, the axial movement of the output gear A and the output gear B away from the housing, and the space occupation of other components in the housing also limits the movement of the output gear A and the output gear B towards the center of the housing. This is the same for the oscillating gear A and the oscillating gear B. Regardless of the axial fixation mode, there will be a certain clearance due to the influence from the process if it is able to move in other directions. However, the term "fix" used in the description of the spatial position can supplement the technical solutions of the present disclosure for the understanding of a person of ordinary skill in the art. Since the technical solutions described in the first paragraph of the SUMMARY OF THE PRESENT DISCLOSURE are satisfied and all components cannot be infinitely long in the axial direction, the gear must be limited to a certain range of relative axial movement in order to satisfy the connection in the spatial positional relationship. This limitation is an implicit limitation that has been used as a necessary condition in the technical solutions described in the first paragraph of the SUMMARY OF THE PRESENT INVENTION. In the technical solutions of this paragraph, a fixation-limited condition is further added.

The A-type intermediate gears and the B-type intermediate gears are axially fixed relative to the housing. The spatial relationship of the axial fixation relative to the housing is further interpreted as follows: the component along the axial direction of the housing in the spatial positional relationship with the housing remains unchanged; or, since a bearing or lubricating oil needs to be arranged between the rotating component and the housing to reserve a clearance for purpose of the radial or circumferential motion relative to the housing, a component along the axial direction of the housing in the spatial positional relationship between the rotating component and the housing is limited in a relatively small fixation range, which is also a fixation mode. Regardless of the axial fixation mode, there will be a certain movable range due to the influence from the process. However, the term "fix" used in the description of the spatial position can supplement the technical solutions of the present disclosure for the understanding of a person of ordinary skill in the art. Since the technical solutions described in the first paragraph of the SUMMARY OF THE PRESENT DISCLOSURE are satisfied and all components cannot be infinitely long in the axial direction, the gear must be limited to a certain range of relative axial movement in order to satisfy the connection relationship. This limitation is an implicit limitation that has been used as a necessary condition in the technical solutions described in the first paragraph; and, during the implementations of the technical solutions described in the first paragraph, a relatively large axial movement space can be reserved for the intermediate gear, in order to satisfy the technical solution in which the meshing axial stress when the intermediate gears are helical gears and worms results in axial displacement and increases the slip limiting resistance. In the technical solutions specially emphasized in this paragraph, technical solutions using fixation as a limitation condition are further added.

The housing of the differential further includes a gear, a spline or a screw hole for being in mechanical connection to a torque input component; and, each of the output gear A and the output gear B further includes a gear or spline for being in mechanical connection to a torque output load. The forgoing technical solutions of the present disclosure are aimed at describing the structure of the differential itself and the mechanical transmission relationship. The mechanical connection structure between the differential and external components is not a part of the structure of the differential for realizing the differential effect, and thus not described in the foregoing technical solutions. Apparently, during the operation of the differential, the differential and all components without power source need to be mechanically connected to the outside. When the differential provided by the present disclosure is applied in a device, the torque input of the differential may be realized by the following technical solutions: a gear circumferentially fixed to the housing is arranged outside the housing, and the gear is meshed with a torque input gear; or, the housing is connected to an input shaft through a spline and coaxially and synchronously rotates with the input shaft. The torque output may be realized by the following solutions: the output gear A and the output gear B are connected to two output shafts through splines and coaxially and synchronously rotate with the output shafts, respectively; or, gears meshed with external torque loads are arranged on the output gear A and the output gear B.

In the differential of the present invention, the distribution of the torque output can be realized by setting the gear ratio of the A-type intermediate gears to the B-type intermediate gears; or, the distribution of the torque output can also be realized by the difference between the gear ratio of the oscillating gear A to the output gear A and the gear ratio of the oscillating gear B to the output gear B. This is an important improvement for the differential of the present invention. By setting the two gear ratios which can adjust the distribution of the output torque, the limitation of the range of torque distribution adjustment range in various differentials in the prior art is overcome. Compared with the prior art, the present disclosure reduces the machining difficulty and machining cost for the design for adjusting torque distribution in the differential, and improves the torque bearing capability in the same size.

The differential of the present disclosure is mainly used for outputting the power of the engine of a vehicle to wheels after passing through the gearbox. When the differential is used as a central differential, the gearbox outputs the torque to the housing of the differential, and the output gear A and the output gear B output the torque to front and rear differentials, respectively. When the differential is used as a front differential or a rear differential, the torque output by a central differential is output to the housing of the differential through a rotation shaft or a gear, and the output gear A and the output gear B of the differential output the torque to left and right wheels, respectively.

The load mentioned in the technical solutions of the present disclosure belongs to a mechanical load which refers to a component to be driven during rotation or a resistance generated by driving other components to rotate. When the differential is applied in a vehicle, the load refers to an axle and wheels to be driven to rotate by the differential, as well as a resistance generated by driving the wheels to rotate. The torque is sometimes referred to as torsion when a rotating component transmits rotation. The work "or" used in the descriptions of the technical solutions of the present disclosure is a logical or relational description.

A cycloidal differential is provided, including a planet carrier, at least two A-type planet gears each having a crank shaft at an end, at least two B-type planet gears each having a crank shaft at an end, at least one A-type oscillating gear, an output gear A, at least one B-type oscillating gear, and an output gear B; wherein an axis of rotation of each A-type planet gear is fixed on the planet carrier, the axis of rotation of each A-type planet gear is parallel to an axis of rotation of the planet carrier, and each A-type planet gear is meshed with at least one B-type planet gear; an axis of a journal of a same-level crank throw of the crank shaft on each A-type planet gear is parallel to the axis of rotation of the gear and has the same distance from the axis of rotation of the gear; the crank shafts on all A-type planet gears are the same in phase, and the journal of the same-level crank throw on each A-type planet gear passes through each shaft hole on a same A-type oscillating gear; a rotation shaft of the output gear A is coaxial with a rotation shaft of the planet carrier, and the output gear A is meshed with each A-type oscillating gear to form an internal gear pair; each A-type oscillating gear has a same tooth contour and an equal number of teeth; an axis of rotation of each B-type planet gear is fixed on the planet carrier, the axis of rotation of each B-type planet gear is parallel to the axis of rotation of the planet carrier, and each B-type planet gear is meshed with at least one A-type planet gear; an axis of a journal of a same-level crank throw of the crank shaft on each B-type planet gear is parallel to the axis of rotation of the gear and has the same distance from the axis of rotation of the gear; the crank shafts on all B-type planet gears are the same in phase, and the journal of the same-level crank throw on each B-type planet gear passes through each shaft hole on a same B-type oscillating gear; a rotation shaft of the output gear B is coaxial with a rotation shaft of the planet carrier, and the output gear B is meshed with each B-type oscillating gear to form an internal gear pair; each B-type oscillating gear has a same tooth contour and an equal number of teeth; each A-type planet gear and each B-type planet gear have the same gear ratio; and, key grooves or holes for connecting components outside the differential are formed on the planet carrier, the output gear A and the output gear B, respectively. The technical solutions are described by using the planet carrier and the planet gears in order to more accurately describe the connection relationship among components. Since there is no conventional sun gear structure in the technical solutions of the present disclosure and the planet gears are meshed with each other, the technical solutions of the present disclosure do not belong to the conventional planet gear transmission mechanism. Naming components or members after planet gears and a planet carrier is merely convenient for describing the relationship between components or members more visually. It is also to be emphasized that the components or members forming the cycloidal differential can be integrally formed components or integrally moving members. Herein, the "A-type planet gear having a crank shaft at an end" is called an "A-type planet gear" for short, the "B-type planet gear having a crank shaft at an end" is called a "B-type planet gear" for short, and the "planet gear having a crank shaft at an end" is called a "planet gear" for short. When a crank shaft of a planet gear has more than two levels of crank throws, it is a common method to form a planet gear member with a crank shaft by an electric shaft sleeve and a noncircular shaft, and the eccentric shaft sleeve can be mounted step by step during the assembly process of the differential according to the order of mounting other components. The journal of the crank throw is a journal of the eccentric shaft on the crank shaft. Each level of crank throw is the eccentric shafts of the previous-level crank throw and an adjacent crank throw of the crank shaft and the eccentric shafts not coaxial with the axis of rotation. The spatial positional relationship in which the crank shafts on all the A-type planet gears are the same in phase can be interpreted as follows: the axes of the journals of the same-level crank throws of the crank shafts on any two A-type planet gears are always parallel to the plane determined by the axes of rotation of the gears. The A-type planet gears and the B-type planet gars may be identical gears, or may be gears that have a different number of teeth and can form an external gear pair. The key groove is in various forms, and a spline structure is commonly used in the differential. The key groove on the planet gear may be any toothed structure with a single tooth or multiple teeth which is convenient for applying a torque to the planet carrier. The hole used for connecting an external component is generally a hole structure for connecting and fixing a component to a component outside the differential through a screw or pin.

The planet carrier rotates under an external force through the key groove or hole to drive each A-type planet gear and each B-type planet gear to revolve with the rotation of the planet carrier; the crank shaft on each A-type planet gear drives all A-type oscillating gears to rotate with the planet carrier, and all A-type oscillating gears drive the output gear A to rotate; the crank shaft on each B-type planet gear drives all B-type oscillating gears to rotate with the planet carrier, and all B-type oscillating gears drive the output gear B to rotate; the output gear A and the output gear B output rotate through key grooves or holes, respectively; when the output gear A and the output gear B are the same in rotation speed, all components in the differential are stationary relative to the planet carrier; when the output gear A and the output gear B are different in rotation speed due to different output loads, the output gear A and the output gear B rotate relative to each other, that is, the output gear A and the output gear B rotate relative to the planet carrier in opposite directions, respectively, so that all oscillating gears A and all oscillating gears B revolve relative to the planet carrier in a direction opposite to the direction of the axis of rotation of the planet carrier, respectively; the revolution of each oscillating gear A and each oscillating gear B relative to the axis of rotation of the planet carrier drives each A-type planet gear and each B-type planet gear to rotate in opposite directions through the crank shafts; and, due to the limitation of the meshing of the A-type planet gears with the B-type planet gears, the output gear A and the output gear B can only rotate in opposite directions relative to the planet carrier at a fixed rotation speed ratio. The principles for implementing the transmission relationship of the rotation motion or the transmission relationship of torque and the differential output in the cycloidal differential of the present disclosure are described above. The implementation principle of the potential slip limiting mechanism in the cycloidal differential of the present disclosure is further explained as follows: the number of teeth of the output gear A and the A-type oscillating gears determines the number of revolutions, using the axis of rotation of the planet carrier as an axis, of each A-type oscillating gear relative to the planet carrier driven by one rotation of the output gear A relative to the planet carrier, the number of revolutions of each A-type oscillating gear is the same as of the number of rotations of each A-type planet gear, and the number of revolutions of each A-type oscillating gear is the same as the number of rotations of each A-type planet gear; and, the number of teeth of the output gear B and the oscillating gears B determines the number of revolutions, using the axis of rotation of the planet carrier as an axis, of each B-type oscillating gear relative to the planet carrier driven by one rotation of the output gear B relative to the planet carrier, the number of revolutions of each B-type oscillating gear is the same as of the number of rotations of each B-type planet gear, and the number of revolutions of each B-type oscillating gear is the same as the number of rotations of each B-type planet gear. When the ratio of the rotation speed ratio of the rotation of the output gear to the oscillating gear in the gear pair is relatively high, particularly when the output gear and the oscillating gear form an internal gear pair with a small tooth difference, due to the presence of the friction and the hydraulic resistance of the lubricating oil, the differential rotational resistance inside the differential during the relative rotation of the output gear A and the output gear B will be enlarged proportionally according to the relative rotation speed. Meanwhile, the differential rotational resistance inside the differential also increases the pressure on the meshing surfaces between the output gear and the meshed oscillating gear, so that the transmission resistance of the gear pair between the output gear and the meshed oscillating gear is increased, and the differential rotational resistance inside the differential during the relative rotation of the output gear A and the output gear B is further increased. The increase in resistance balances a difference in external output resistance that causes the difference in rotation speed between the output gear A and the output gear B, so that the output gear A and the output gear B tend to output at the same speed, and the slip limiting effect is thus achieved. Specifically, whether the locking can be realized in case of slipping depends upon the maximum value of the increase in the differential rotational resistance inside the differential. Theoretically, when the differential rotational resistance inside the differential caused by the relative torque or relative rotation speed of the output gear A and the output gear B is greater than or equal to the torque input into the planet carrier, the relative locking between the output gear A and the output gear B can be realized. The output load refers to the resistance of the rotation of an external component to be driven by the output gear after being connected to the external component through a key groove or hole.

A cycloidal differential is provided, including a planet carrier, at least two A-type planet gears each having a crank shaft at an end, at least two B-type planet gears each having a crank shaft at an end, two A-type oscillating gears, an output gear A, two B-type oscillating gears, and an output gear B; wherein an axis of rotation of each A-type planet gear is fixed on the planet carrier, the axis of rotation of each A-type planet gear is parallel to an axis of rotation of the planet carrier, and each A-type planet gear is meshed with at least one B-type planet gear; the crank shaft on each A-type planet gear is provided with a two-stage eccentric shaft, and a phase difference of the two-stage eccentric shaft is 180 degrees; axes of the eccentric shafts of the crank shafts on all A-type planet gears are parallel to the axes of rotation of the planet gears and have a same eccentric distance; the crank shafts on all A-type planet gears are the same in phase, and the two-stage eccentric shaft on each A-type planet gear passes through corresponding shaft holes on the two A-type oscillating gears, respectively; an axis of rotation of the output gear A is coaxial with the axis of rotation of the planet carrier, and the output gear A is meshed with the two A-type oscillating gears to form an internal gear pair, respectively; the two A-type oscillating gear have a same tooth contour and an equal number of teeth; an axis of rotation of each B-type planet gear is fixed on the planet carrier, the axis of rotation of each B-type planet gear is parallel to the axis of rotation of the planet carrier, and each B-type planet gear is meshed with at least one A-type planet gear; the crank shaft on each B-type planet gear is provided with a two-stage eccentric shaft, and a phase difference of the two-stage eccentric shaft is 180 degrees; axes of the eccentric shafts of the crank shafts on all B-type planet gears are parallel to the axes of rotation of the planet gears and have a same eccentric distance; the crank shafts on all B-type planet gears are the same in phase, and the two-stage eccentric shaft on each B-type planet gear passes through corresponding shaft holes on the two B-type oscillating gears, respectively; an axis of rotation of the output gear B is coaxial with the axis of rotation of the planet carrier, and the output gear B is meshed with the two B-type oscillating gears to form an internal gear pair, respectively; the two B-type oscillating gear have a same tooth contour and an equal number of teeth; each A-type planet gear and each B-type planet gear have the same gear ratio; and, toothed structures or hole structures for connecting components outside the differential are formed on the planet carrier, the output gear A and the output gear B, respectively. The technical solutions are described by using the planet carrier and the planet gears in order to more accurately describe the connection relationship among components. Since there is no conventional sun gear structure in the technical solutions of the present disclosure and the planet gears are meshed with each other, the technical solutions of the present disclosure do not belong to the conventional planet gear transmission mechanism. Naming components or members after planet gears and a planet carrier is merely convenient for describing the relationship between components or members more visually. It is also to be emphasized that the components or members forming the cycloidal differential can be integrally formed components or integrally moving members. Herein, the "A-type planet gear having a crank shaft at an end" is called an "A-type planet gear" for short, the "B-type planet gear having a crank shaft at an end" is called a "B-type planet gear" for short, and the "planet gear having a crank shaft at an end" is called a "planet gear" for short. The spatial positional relationship in which the crank shafts on all the A-type planet gears are the same in phase can be interpreted as follows: the axes of the journals of the same-level crank throws of the crank shafts on any two A-type planet gears are always parallel to the plane determined by the axes of rotation of the gears. The phase difference between the two-stage eccentric shafts on the planet carrier is 180 degrees, the revolution phase difference between two oscillating gears through which the eccentric shafts pass is 180 degrees. The phase difference of 180 degrees between the two oscillating gears when meshed with a same output gear ensures that the radial pressures applied to the output gear by the two oscillating gears are balanced out, and thus ensures that the center of gravity of the whole differential during rotation is centered. The A-type planet gears and the B-type planet gars may be identical gears, or may be gears that have a different number of teeth and can form an external gear pair. The toothed structure is in various forms, and a spline structure is commonly used in the differential. The toothed structure on the planet gear may be any toothed structure with a single tooth or multiple teeth which is convenient for applying a torque to the planet carrier. The hole structure used for connecting an external component is generally a screw hole or pin hole for connecting and fixing a component to a component outside the differential through a screw or pin.

A cycloidal differential is provided, including a planet carrier, at least two A-type planet gears each having a crank shaft at an end, at least two B-type planet gears each having a crank shaft at an end, two A-type oscillating gears, an output gear A, two B-type oscillating gears, an output gear B, and at least two friction plates, wherein an axis of rotation of each A-type planet gear is fixed on the planet carrier, the axis of rotation of each A-type planet gear is parallel to an axis of rotation of the planet carrier, and each A-type planet gear is meshed with at least one B-type planet gear; the crank shaft on each A-type planet gear is provided with a two-stage eccentric shaft, and a phase difference of the two-stage eccentric shaft is 180 degrees; axes of the eccentric shafts of the crank shafts on all A-type planet gears are parallel to the axes of rotation of the planet gears and have a same eccentric distance; the crank shafts on all A-type planet gears are the same in phase, and the two-stage eccentric shaft on each A-type planet gear passes through corresponding shaft holes on the two A-type oscillating gears, respectively; an axis of rotation of the output gear A is coaxial with the axis of rotation of the planet carrier, and the output gear A is meshed with the two A-type oscillating gears to form an internal gear pair, respectively; the two A-type oscillating gear have a same tooth contour and an equal number of teeth; friction plates are arranged between the A-type oscillating gears and other components; an axis of rotation of each B-type planet gear is fixed on the planet carrier, the axis of rotation of each B-type planet gear is parallel to the axis of rotation of the planet carrier, and each B-type planet gear is meshed with at least one A-type planet gear; the crank shaft on each B-type planet gear is provided with a two-stage eccentric shaft, and a phase difference of the two-stage eccentric shaft is 180 degrees; axes of the eccentric shafts of the crank shafts on all B-type planet gears are parallel to the axes of rotation of the planet gears and have a same eccentric distance; the crank shafts on all B-type planet gears are the same in phase, and the two-stage eccentric shaft on each B-type planet gear passes through corresponding shaft holes on the two B-type oscillating gears, respectively; an axis of rotation of the output gear B is coaxial with the axis of rotation of the planet carrier, and the output gear B is meshed with the two B-type oscillating gears to form an internal gear pair, respectively; the two B-type oscillating gear have a same tooth contour and an equal number of teeth; friction plates are arranged between the B-type oscillating gears and other components; each A-type planet gear and each B-type planet gear have the same gear ratio; and, toothed structures or hole structures for connecting components outside the differential are formed on the planet carrier, the output gear A and the output gear B, respectively. The technical solutions are described by using the planet carrier and the planet gears in order to more accurately describe the connection relationship among components. Since there is no conventional sun gear structure in the technical solutions of the present disclosure and the planet gears are meshed with each other, the technical solutions of the present disclosure do not belong to the conventional planet gear transmission mechanism. Naming components or members after planet gears and a planet carrier is merely convenient for describing the relationship between components or members more visually. It is also to be emphasized that the components or members forming the cycloidal differential can be integrally formed components or integrally moving members. Herein, the "A-type planet gear having a crank shaft at an end" is called an "A-type planet gear" for short, the "B-type planet gear having a crank shaft at an end" is called a "B-type planet gear" for short, and the "planet gear having a crank shaft at an end" is called a "planet gear" for short. The spatial positional relationship in which the crank shafts on all the A-type planet gears are the same in phase can be interpreted as follows: the axes of the journals of the same-level crank throws of the crank shafts on any two A-type planet gears are always parallel to the plane determined by the axes of rotation of the gears. The phase difference between the two-stage eccentric shafts on the planet carrier is 180 degrees, the revolution phase difference between two oscillating gears through which the eccentric shafts pass is 180 degrees. The phase difference of 180 degrees between the two oscillating gears when meshed with a same output gear ensures that the radial pressures applied to the output gear by the two oscillating gears are balanced out, so that the radial load on the output gear is reduced, and the radial loads on the planet gear and the crank shaft on the planet gear are also reduced. Meanwhile, it is also ensured that the center of gravity of the whole differential during rotation is centered. The A-type planet gears and the B-type planet gars may be identical gears, or may be gears that have a different number of teeth and can form an external gear pair. The friction plate is used for increasing the friction between components. The toothed structure is in various forms, and a spline structure is commonly used in the differential. The toothed structure on the planet gear may be any toothed structure with a single tooth or multiple teeth which is convenient for applying a torque to the planet carrier. The hole structure used for connecting an external component is generally a screw hole or pin hole for connecting and fixing a component to a component outside the differential through a screw or pin.

The gear pair consisting of the A-type oscillating gear and the output gear A or the gear pair consisting of the B-type oscillating gear and the output gear B is a cycloidal gear pair. The cycloidal gear pair includes a cycloidal pin wheel gear pair. When the cycloidal gear pair has a small tooth difference, one rotation of the two gears relative to each other will correspond to multiple revolutions of one gear about the axis of rotation of the other gear, so that the resistance during rotation can be enlarged. Moreover, the cycloidal gear may be a gear with fewer teeth, so the bearing capacity of the gear is increased in a limited space. Additionally, by adjusting the tooth shape of the cycloidal gear, the relationship between the rotational resistance of the gear meshing and the meshing torque can be adjusted, so that it is more advantageous for implementing differentials with different slip limiting capabilities.

Both the A-type planet gears and the B-type planet gears are helical gears or worms. A gear pair consisting of helical gears can generate an axial stress during the relative rotation. The axial stress is advantageous for increasing the friction pressure between the gear and other axial components, i.e., increasing the resistance of rotation of the gear. The worm is a kind of gear. A gear pair consisting of worms generates an axial stress during the relative rotation. This axial stress increases the friction between the worms in the worm gear pair, so as to increase the resistance of rotation of the worms. Meanwhile, this axial stress is advantageous for increasing the friction pressure between the worms and other axial components, i.e., increasing the resistance of rotation of the worms. After the angle of lead of the worms is less than a certain angle, the gear pair consisting of worms will be self-locked in case of a certain relative torque. After the resistance of rotation of the planet gears is increased to a certain fixed value, the resistance causing the meshing rotation of the planet gears A and the planet gears B will exceed the torque causing the relative rotation of the planet gears A and the planet gears B, so that the locking of the differential is realized.

The cycloidal differential includes at least three A-type planet gears and at least three B-type planet gears. In more than three A-type planet gears and more than three B-type planet gears, at least three crank shafts are connected to the A-type oscillating gear and the B-type oscillating gear, so it is more advantages for the stability of the revolution of the oscillating gears about the axis of rotation of the planet. The three crank shafts are more advantageous for the torque load capability for the rotation of the planet carrier to drive the oscillating gears to synchronously rotate with the planet carrier.

In the above-mentioned cycloidal differential, the differential includes two A-type oscillating gears having a revolution phase difference of 180 degrees or two B-type oscillating gears having a revolution phase difference of 180 degrees. When two oscillating gears are meshed with a same output gear, the phase difference of 180 degrees ensures that the radial pressures applied to the output gear by the two oscillating gears are balanced out, so that the radial load on the output gear is reduced and the radial loads on the planet gears and the crank shafts on the planet gears are also reduced. Meanwhile, it is also ensured that the center of gravity of the whole differential during rotation is centered.

In the cycloidal differential, each A-type planet gear having a crank shaft at an end or each B-type planet gear having a crank shaft at an end consists of a gear component having a non-circular shaft extended from an end and an eccentric shaft sleeve sheathed on the non-circular shaft. When the crank shaft on the planet gear has a two-stage eccentric shaft, it is a common method to form a planet gear member with a crank shaft by an electric shaft sleeve and a non-circular shaft, and the eccentric shaft sleeve can be mounted step by step during the assembly process of the differential according to the order of mounting other components. In the cycloidal differential, at least one limiting structure is arranged on the planet carrier, and the limiting structure radially limits the output gear A and the output gear B, axially limits the output gear A and the output gear B and axially limits the A-type planet gears and the B-type planet gears. In the differential, there is no need for precise output accuracy, but it is more necessary to show different differential rotation internal resistances of the differential under different differential conditions. Thus, the arrangement of components with a certain shake allowance in relative position is advantageous to reduce the differential rotation internal resistance during the normal driving process, and can also ensure that the compression of components due to the axial stress caused by the meshing between gears inside the differential increases the differential rotation internal resistance of the differential when line sliding is required in case of a large difference.

In the cycloidal differential, the differential further includes a housing on which at least one limiting structure is arranged, and the limiting structure radially limits the planet carrier, the output gear A and the output gear B and axially limits the output gear A and the output gear B. In some cases, a separate housing is additionally provided for the differential, and the housing is not necessarily circumferentially fixed to the planet carrier, or even the housing may be a part of the gearbox housing. The housing can effectively provide a limiting effect on some necessary components, and can also carry the lubricating oil so as to provide better control to the flow of the lubricating oil.

In the cycloidal differential, the differential further includes a housing which is circumferentially fixed to the planet carrier, and a key groove or hole for connecting a component outside the differential or a gear meshed with a component outside the differential is provided on the housing. In some cases, particularly in a case where the differential is used as a rear differential, the planet carrier of the differential is to be connected or linked with a torque input component through the housing. At this time, the housing must be circumferentially fixed to the planet carrier.

In the cycloidal differential, the planet carrier consists of two components or members which are radially fixed relative to each other or circumferentially fixed relative to each other. The two-piece planet carrier is arranged at two ends of the planet carrier in the axial direction, respectively. In the axial direction, the two-piece planet carrier is allowed to have a certain moving clearance under the mutual limitation or the limitation of other components, which does not affect the planet carrier to drive the planet gears to revolve. Particularly when the planet gears are helical gears or worms, the planet carrier can move axially under the drive of the axial stress of the planet gears. It is advantageous to increase the friction between the planet carrier and the oscillating gears inside the differential when the meshing torque of the planet gears is large in case of slipping of the differential, and even further increase the friction between the oscillating gears and other components. Accordingly, the differential rotational resistance inside the differential can be increased, and the slip limiting effect can be improved.

In the cycloidal differential of the present invention, the distribution of the torque output can be realized by setting the gear ratio of the A-type planet gears to the B-type plate gears; or, the distribution of the torque output can also be realized by the difference between the gear ratio of the A-type oscillating gear to the output gear A and the gear ratio of the B-type oscillating gear to the output gear B. This is an important improvement for the differential of the present disclosure compared to the prior art. By setting the two gear ratios which can adjust the distribution of the output torque, the limitation of the range of torque distribution adjustment range in various differentials in the prior art can be overcomed. Compared with the prior art, in the present invention, the machining difficulty and machining cost for the design for adjusting torque distribution in the differential are reduced; and, compared with some differentials in the prior art, the differential of the present disclosure improves the torque bearing capability in the same size, or the size of the differential under the same load bearing capability is reduced, so that the rotation inertia of the transmission mechanism can be reduced and the transmission efficiency can thus be effectively improved.

The cycloidal differential of the present disclosure is mainly used for outputting the power of the engine of a vehicle to wheels after passing through the gearbox. When the cycloidal differential is used as a central differential, the gearbox outputs the torque to the planet carrier of the differential, and the output gear A and the output gear B output the torque to front and rear differentials, respectively. When the cycloidal differential is used as a front differential or a rear differential, the torque output by a central differential is generally output to the housing of the differential through a rotation shaft or a gear, the housing of the differential drives the planet carrier, and the output gear A and the output gear B of the differential output the torque to left and right wheels, respectively.

Therefore, a heretofore unaddressed need exists in the art to address the aforementioned deficiencies and inadequacies.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

in which: 1: housing; 2: A-type intermediate gear; 3: B-type intermediate gear; 4: oscillating gear A; 5: oscillating gear B; 6: output gear A; 7: output gear B; and, 8: friction plate.

Figure 11:
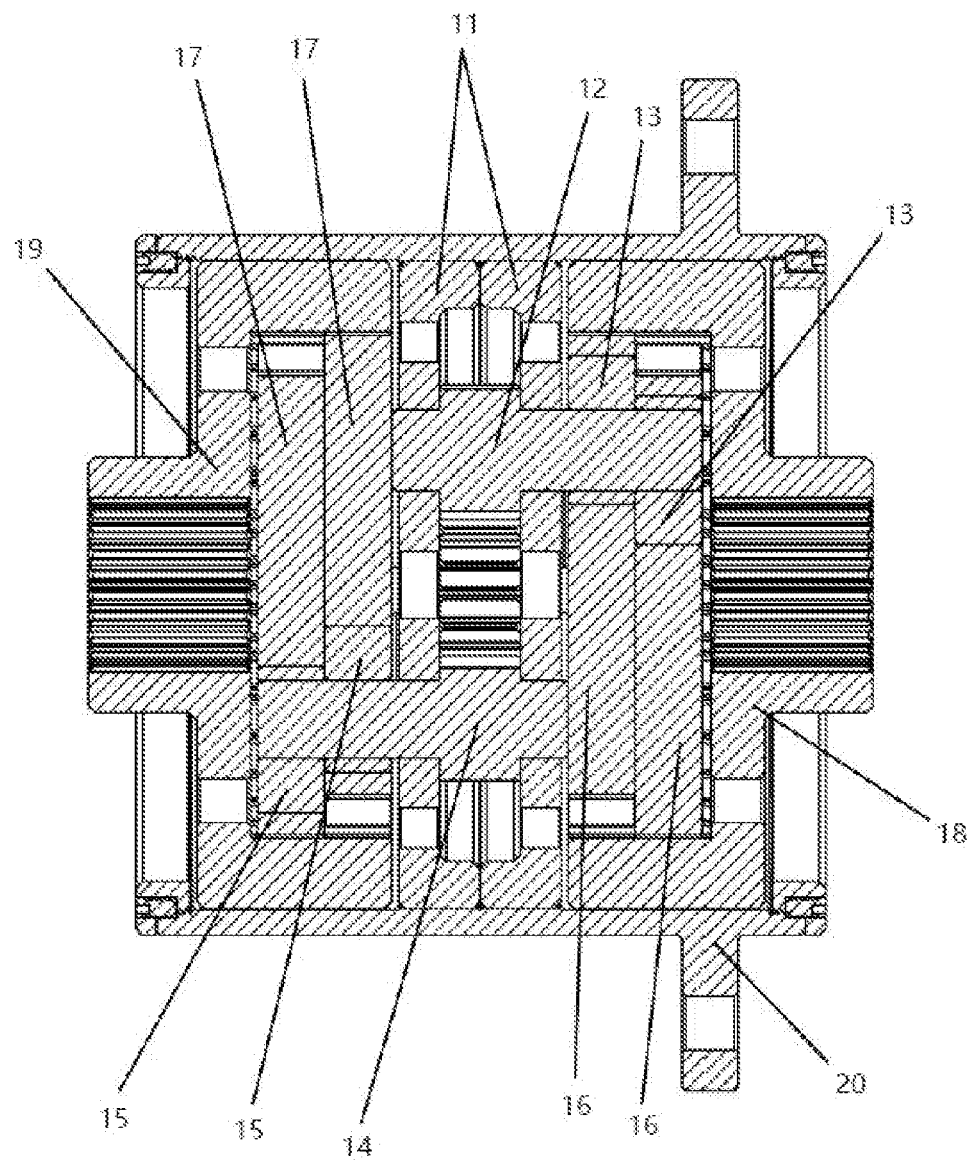
Figure 12:
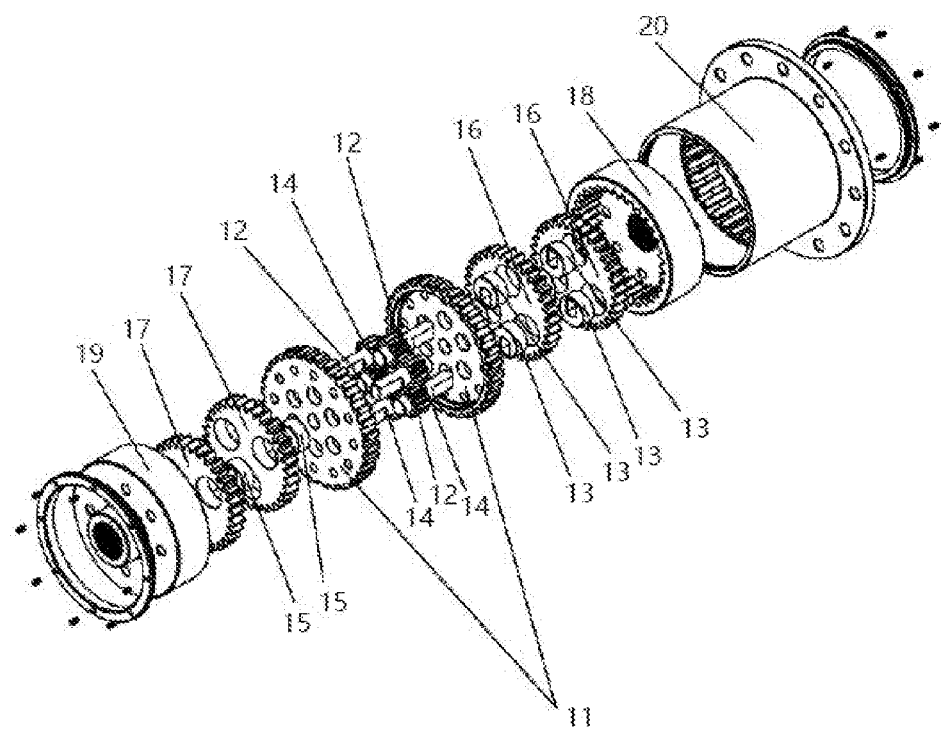
Figure 13:
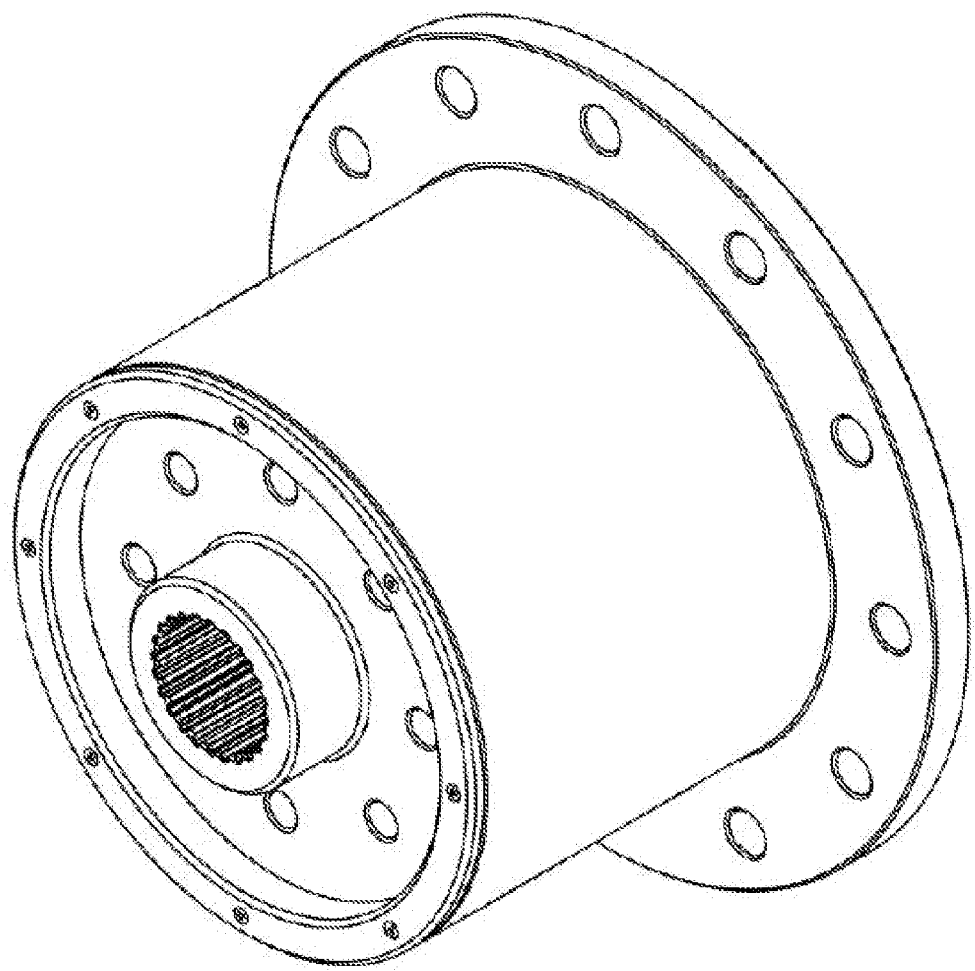
Figure 14:
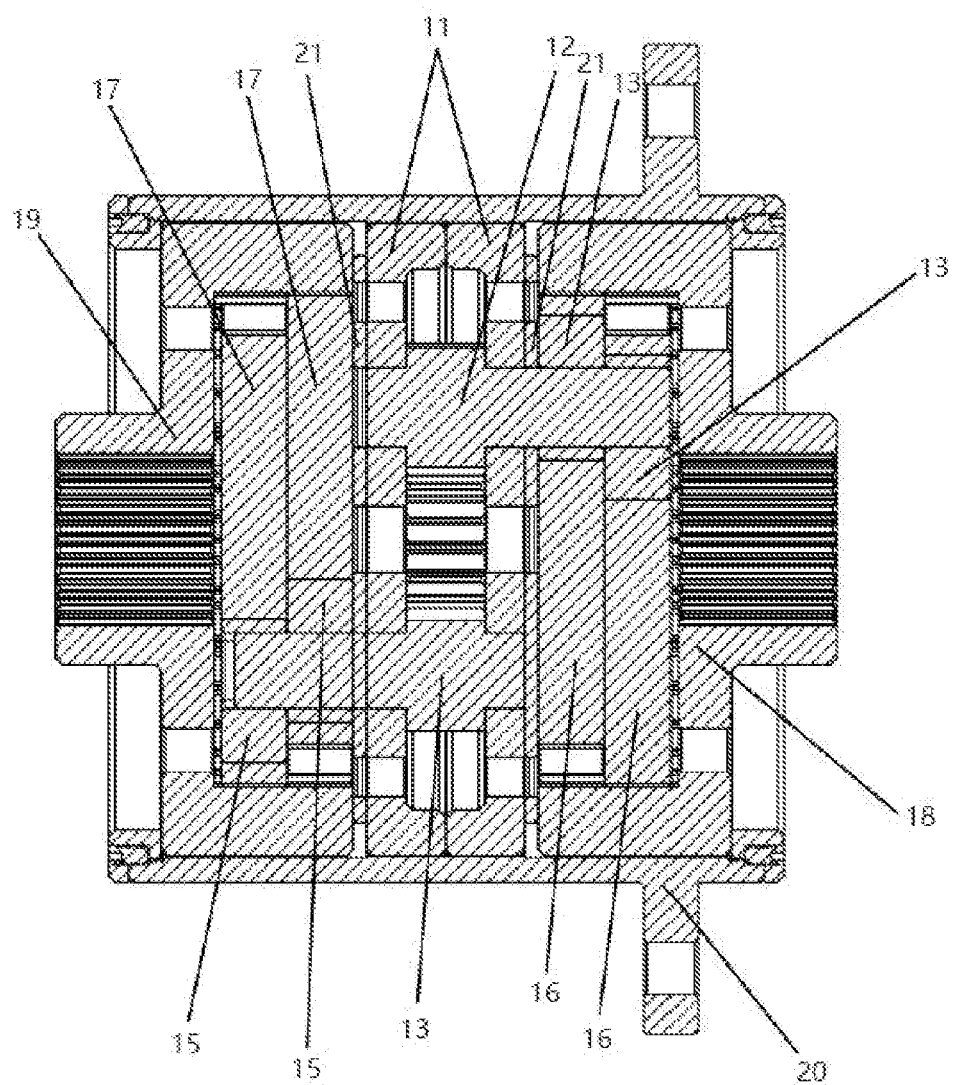
Figure 15:
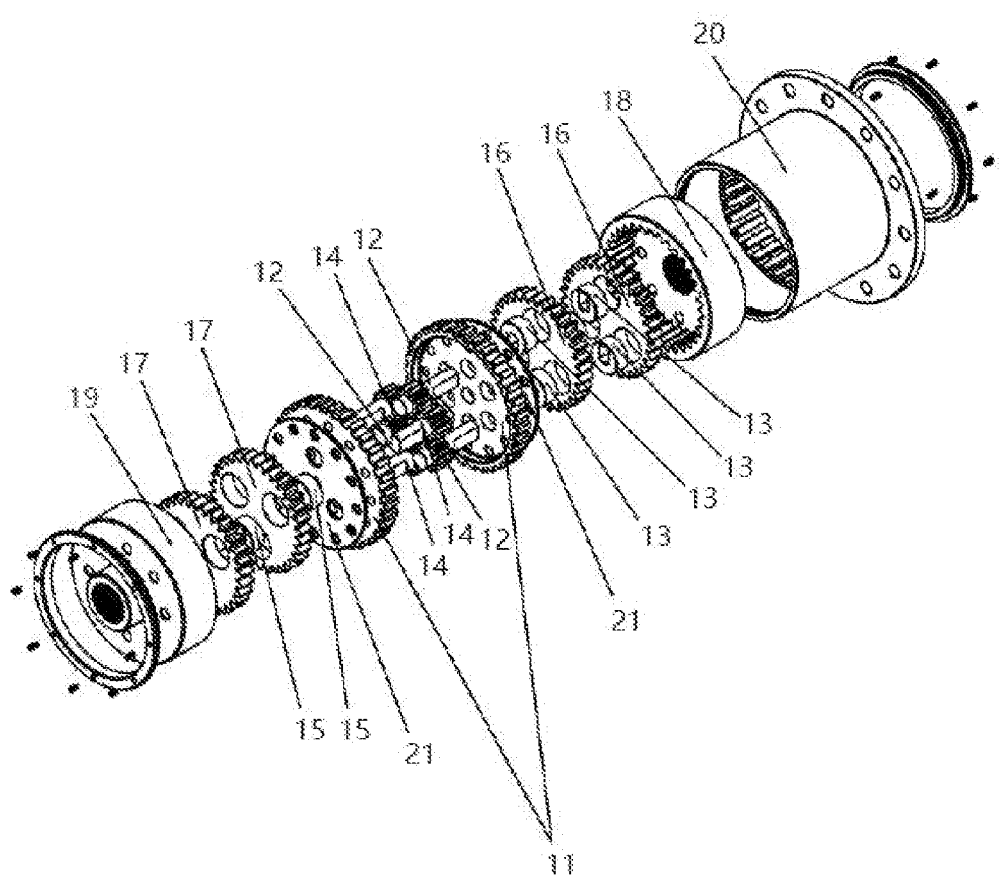

FIG. 11 is a schematic structure diagram of a cycloidal differential in Embodiment 7;

FIG. 12 is an exploded view of components of the cycloidal differential in Embodiment 7;

FIG. 13 is a stereoscopic diagram of the cycloidal differential in Embodiment 7;

FIG. 14 is a schematic structure diagram of a cycloidal differential in Embodiment 8; and FIG. 15 is an exploded view of the cycloidal differential in Embodiment 8;

in which: 11: planet carrier; 12: gear component with a non-circular shaft at an end of the A-type planet gear; 13: eccentric shaft sleeve component included in the A-type planet gear; 14: gear component with a non-circular shaft at an end of the B-type planet gear; 15: eccentric shaft sleeve component included in the B-type planet gear; 16: A-type oscillating gear; 17: B-type oscillating gear; 18: output gear A; 19: output gear B; 20: housing; and, 21: friction plate.

DETAILED DESCRIPTION OF THE EMBODIMENTS

Figure 1:
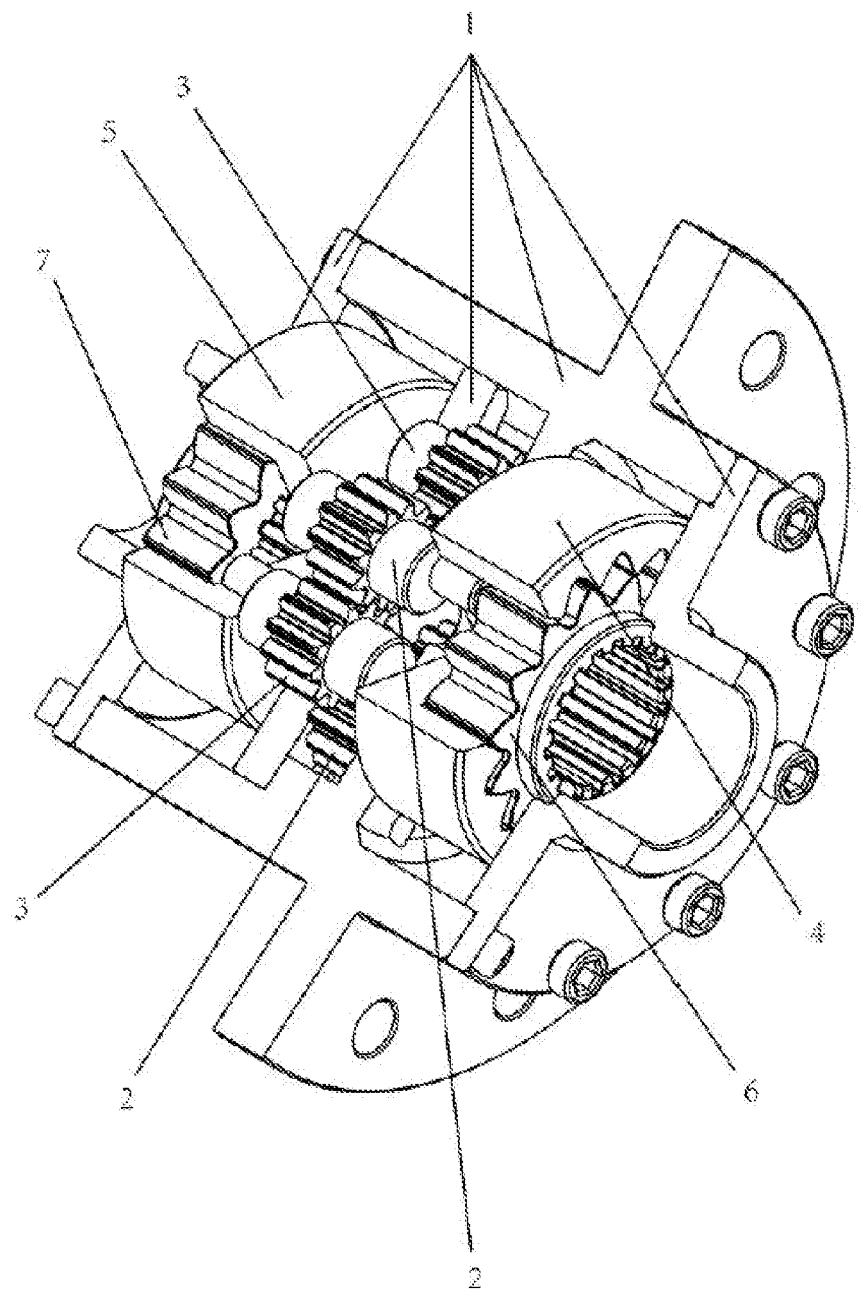
FIG. 1 is a sectional view showing the schematic structure of a differential in Embodiment 1.
Figure 2:
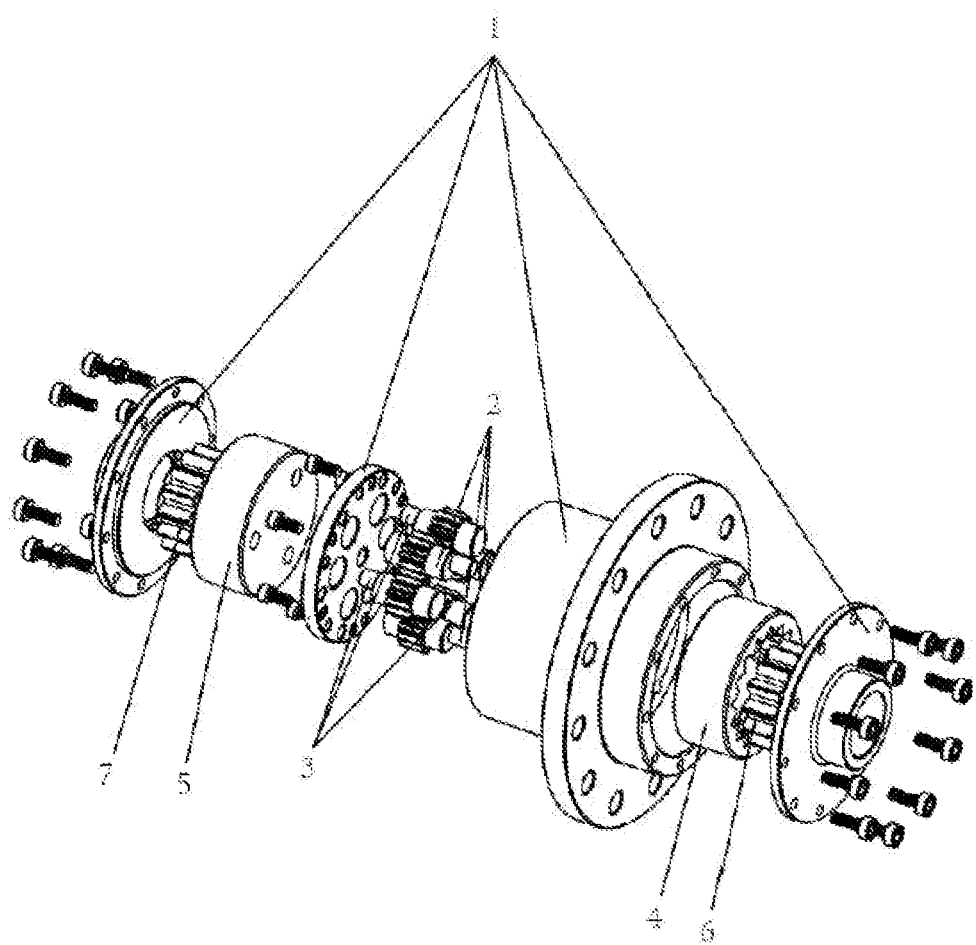
FIG. 2 is an exploded view of components of the differential in Embodiment 1.
Figure 3:
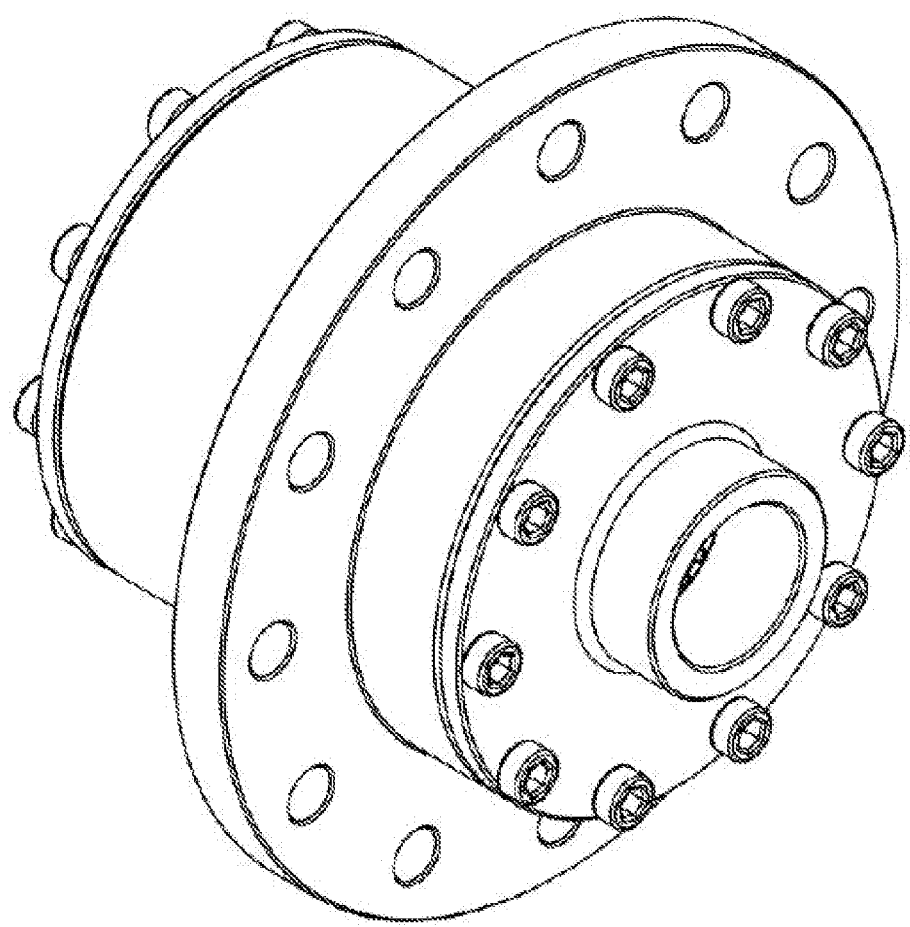
FIG. 3 is a stereoscopic diagram of the differential in Embodiment 1.

Embodiment 1: As shown in FIG. 1, FIG. 2 and FIG. 3, in this embodiment, the A-type intermediate gears are three identical involute straight gears, the B-type intermediate gears are three identical involute straight gears, and the A-type intermediate gears and the B-type intermediate gears have an equal number of teeth. The three A-type intermediate gears are meshed with the three B-type intermediate gears to form three gear pairs. The oscillating gear A and the output gear A are an internal cycloidal gear pair having a tooth difference of 2. The output gear A is an external gear. Each A-type intermediate gear is provided with shafts at two ends and provided with an eccentric shaft extending axially at an end. The eccentric shafts on the three A-type intermediate gears are inserted into shaft holes on an end face of the oscillating gear A. The oscillating gear B and the output gear B are an internal cycloidal gear pair that has the same tooth shape and the same number of teeth as the oscillating gear A and the output gear A. The output gear B is an external gear. Each B-type intermediate gear is provided with shafts at two ends and provided with an eccentric shaft extending axially at an end. The eccentric shafts on the three B-type intermediate gears are inserted into shaft holes on an end face of the oscillating gear B, respectively. Shaft holes with splines are formed at centers of the output gear A and the output gear B. As shown in FIG. 1, FIG. 2 and FIG. 3, the housing is a member consisting of four components, and is assembled and fixed by screws. The housing is provided with shaft holes for connecting the shafts at two ends of the intermediate gear. The housing is further provided with mounting holes for mounting external gears.

Figure 4:
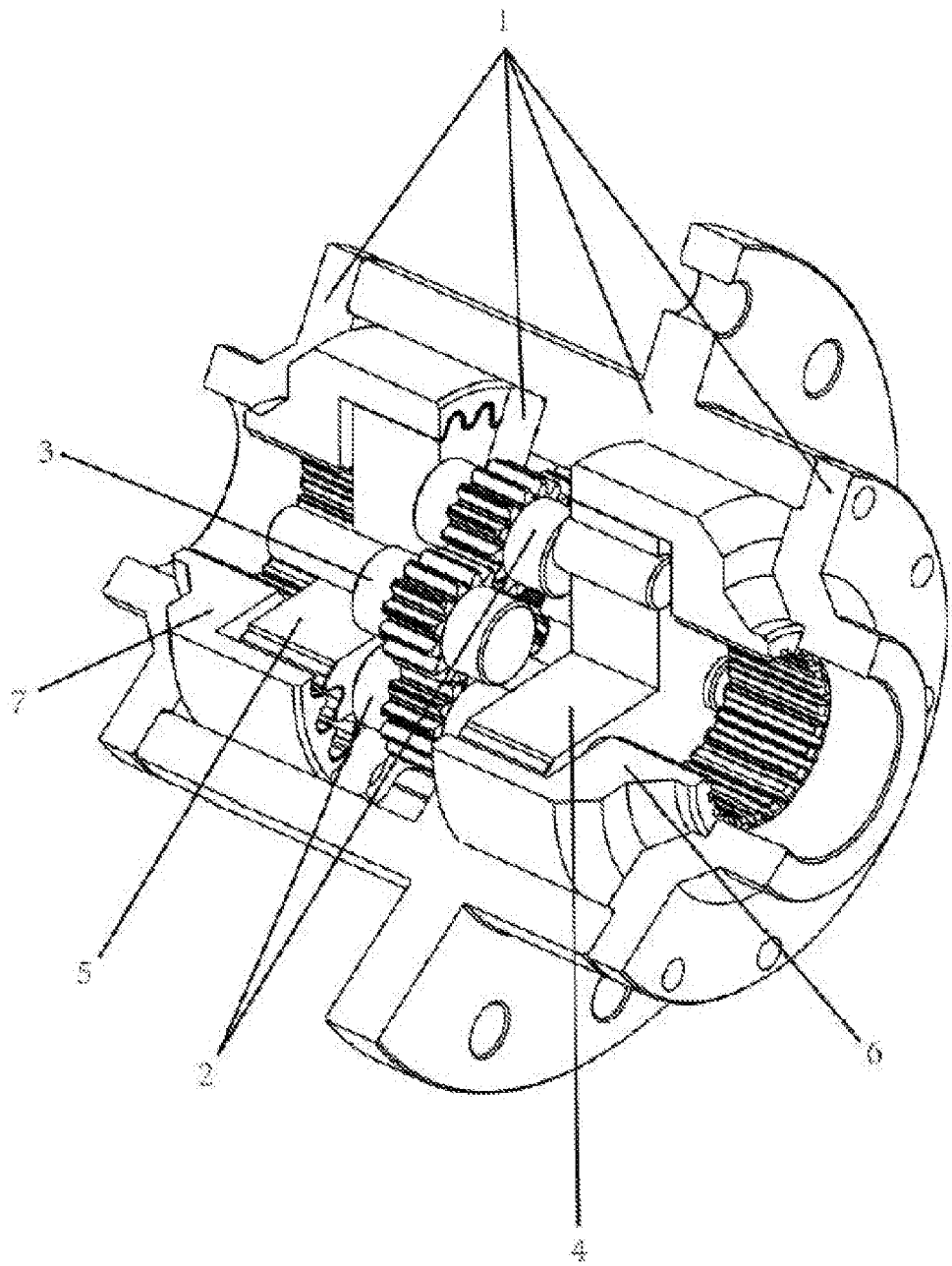
FIG. 4 is a sectional view showing the schematic structure of a differential in Embodiment 2 (where screws are hidden)
Figure 5:
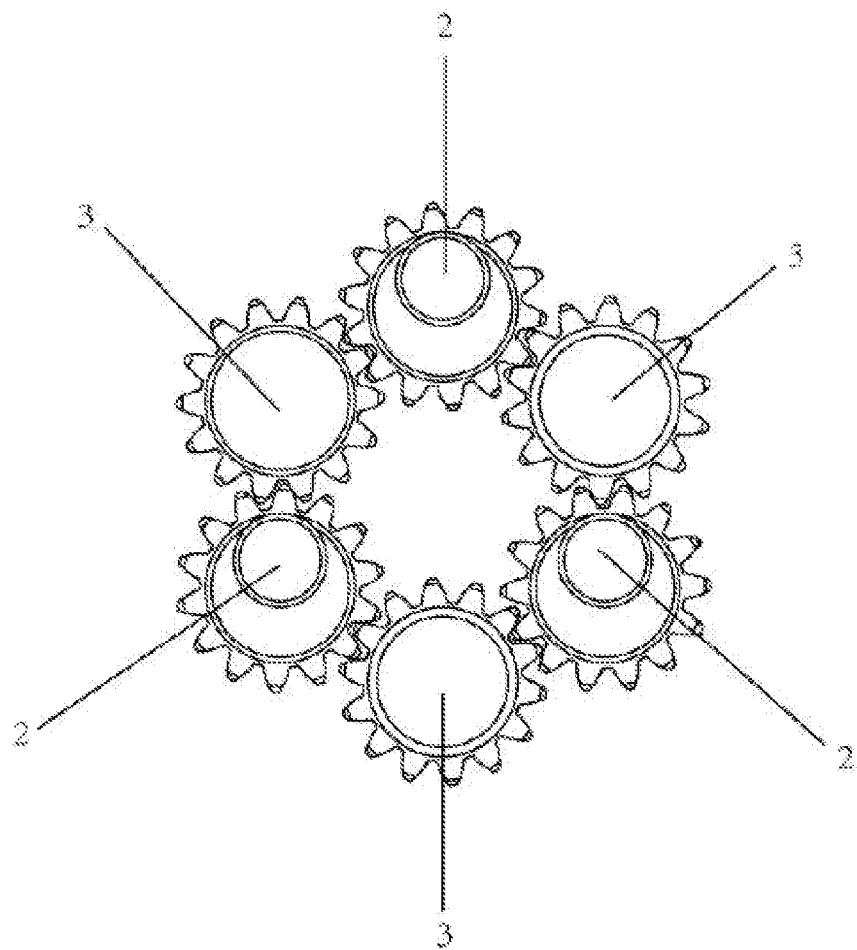
FIG. 5 is a close-up view of intermediate gears of the differential in Embodiment 2 (where other components are hidden)

Embodiment 2: As shown in FIG. 4 and FIG. 5, in this embodiment, the A-type intermediate gears are three identical involute straight gears, the B-type intermediate gears are three identical involute straight gears, and the A-type intermediate gears and the B-type intermediate gears have an equal number of teeth. Each A-type intermediate gear is meshed with two adjacent B-type intermediate gears, and each B-type intermediate gear is meshed with two adjacent A-type intermediate gears, so that the six intermediate gears form one group. In this way, the torque bearing capabilities of the gears can better improved, the meshing friction area of the intermediate gears can be increased, and the rational resistance can be increased. The oscillating gear A and the output gear A are an internal cycloidal gear pair having a tooth difference of 2. The output gear A is an external gear. Each A-type intermediate gear is provided with shafts at two ends and provided with an eccentric shaft extending axially at an end. The eccentric shafts on the three A-type intermediate gears are inserted into shaft holes on an end face of the oscillating gear A. The oscillating gear B and the output gear B are an internal cycloidal gear pair that has the same tooth shape and the same number of teeth as the oscillating gear A and the output gear A. The output gear B is an internal gear. Each B-type intermediate gear is provided with shafts at two ends and provided with an eccentric shaft extending axially at an end. The eccentric shafts on the three B-type intermediate gears are inserted into shaft holes on an end face of the oscillating gear B, respectively. Shaft holes with splines are formed on the output gear A and the output gear B. As shown in FIGS. 4, 5, the housing is a member consisting of four components, and is assembled and fixed by screws. The housing is provided with shaft holes for connecting the shafts at two ends of the intermediate gear. The housing is further provided with mounting holes for mounting external gears.

Figure 6:
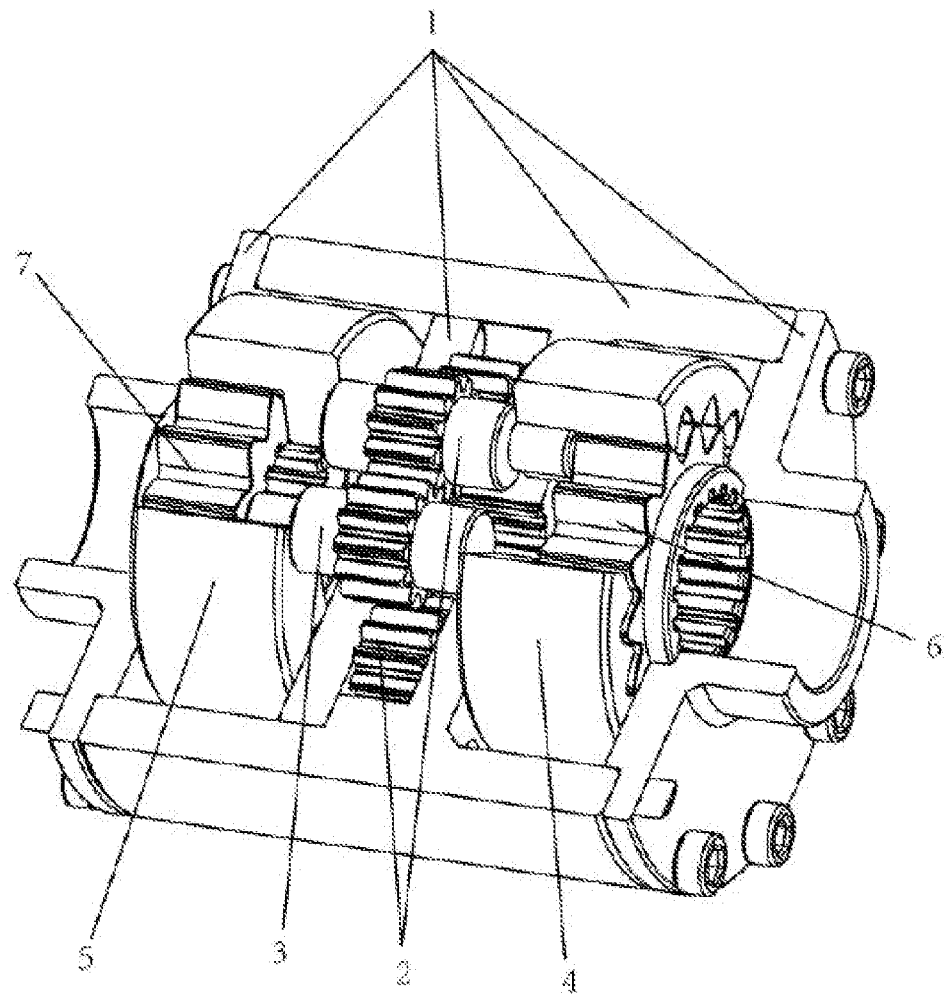
FIG. 6 is a sectional view showing the schematic structure of a differential in Embodiment 3.

Embodiment 3: As shown in FIG. 6, in this embodiment, the A-type intermediate gears are three identical involute straight gears, the B-type intermediate gears are three identical involute straight gears, and the A-type intermediate gears and the B-type intermediate gears have an equal number of teeth. The three A-type intermediate gears are meshed with the three B-type intermediate gears to form three gear pairs. The oscillating gear A and the output gear A are an internal cycloidal gear pair having a tooth difference of 2. The output gear A is an external gear. Each A-type intermediate gear is provided with shafts at two ends and provided with an eccentric shaft extending axially at an end. The eccentric shafts on the three A-type intermediate gears are inserted into shaft holes on an end face of the oscillating gear A. The oscillating gear B and the output gear B are an internal cycloidal gear pair that has the same tooth shape and the same number of teeth as the oscillating gear A and the output gear A. The output gear B is an external gear. Each B-type intermediate gear is provided with shafts at two ends and provided with an eccentric shaft extending axially at an end. The eccentric shafts on the three B-type intermediate gears are inserted into shaft holes on an end face of the oscillating gear B, respectively. Shaft holes with splines are formed at centers of the output gear A and the output gear B. As shown in FIG. 6, the housing is a member consisting of four components, and is assembled and fixed by screws. The housing is provided with shaft holes for connecting the shafts at two ends of the intermediate gear. The housing is further provided with a coaxial spline hole for connecting an input torque through a shaft.

Figure 7:
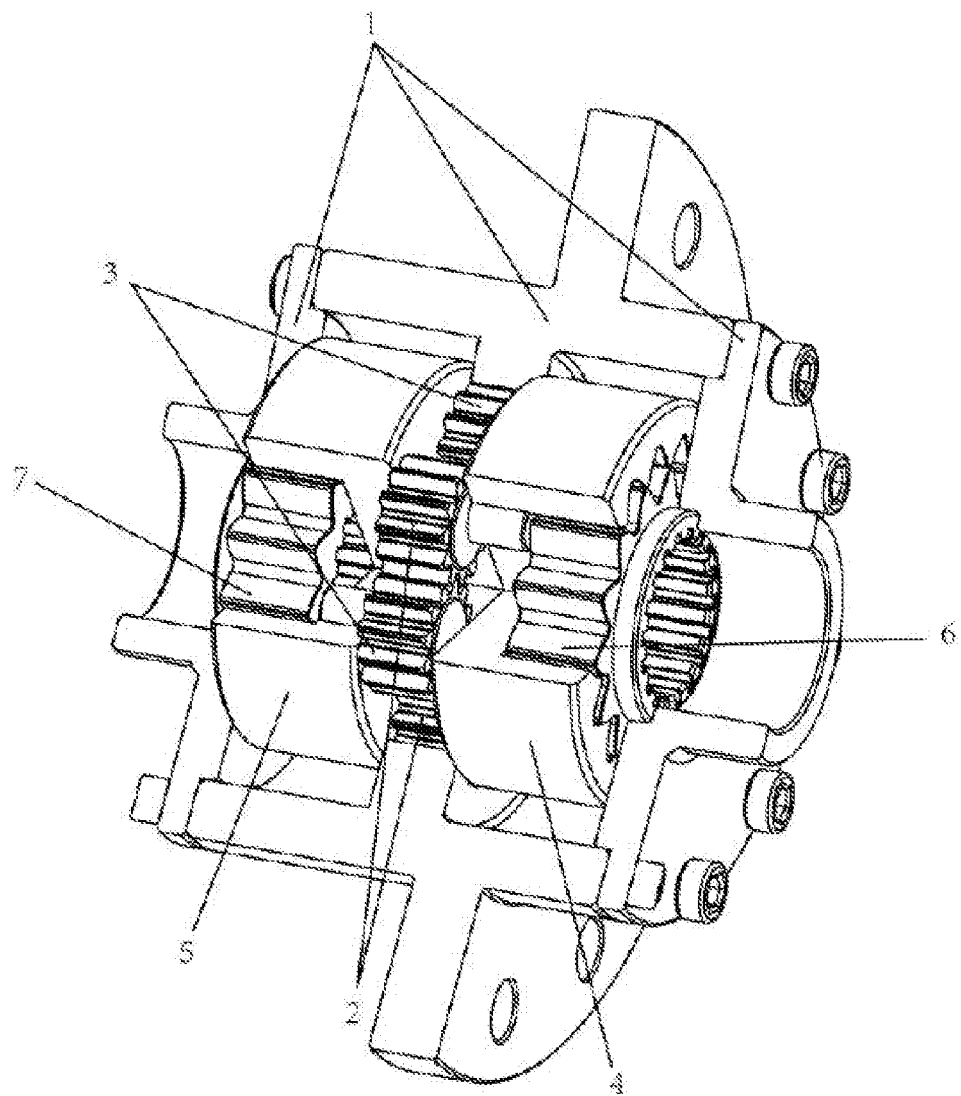
FIG. 7 is a sectional view showing the schematic structure of a differential in Embodiment 4.
Figure 8:
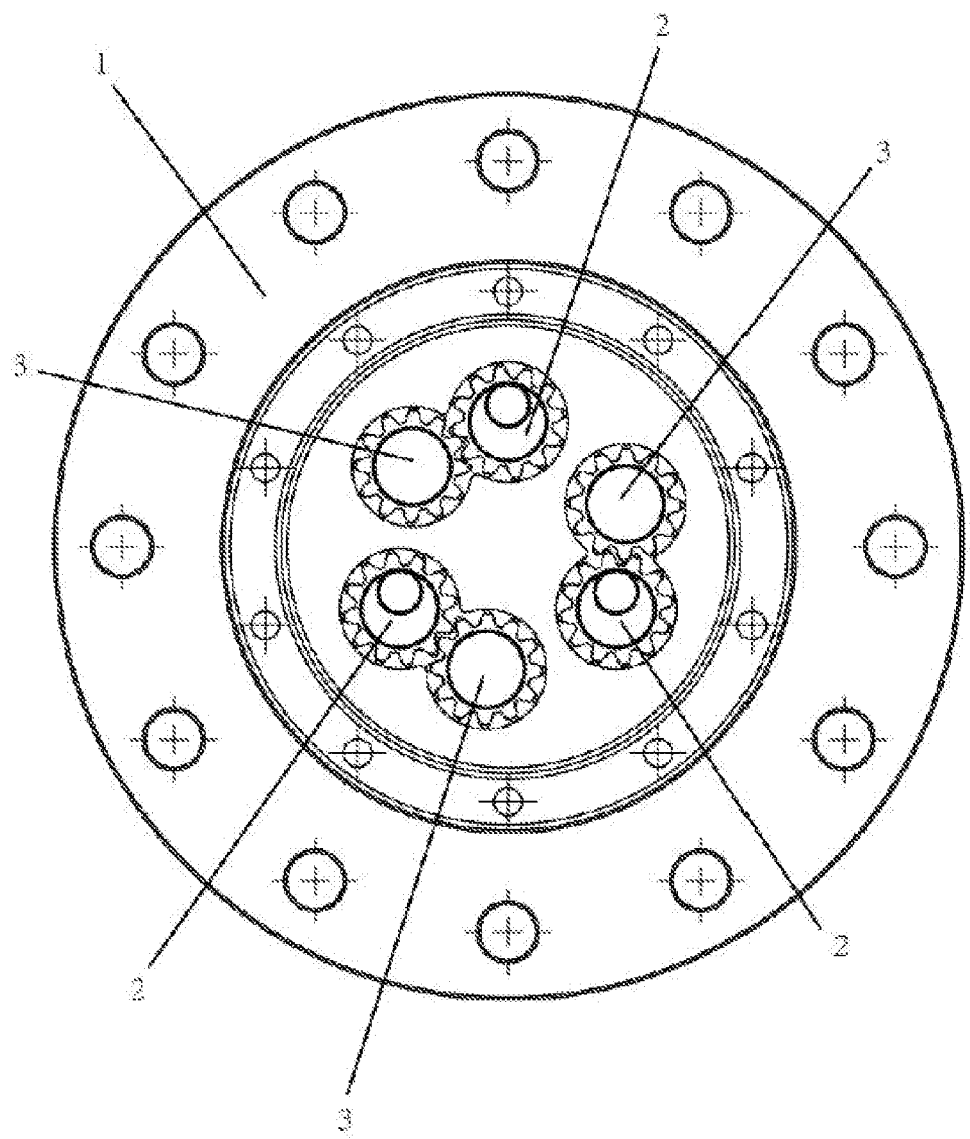
FIG. 8 is a close-up view of intermediate gears of the differential in Embodiment 4 (where other components are hidden and a part of the housing is reserved)

Embodiment 4: As shown in FIG. 7 and FIG. 8, in this embodiment, the A-type intermediate gears are three identical involute straight gears, the B-type intermediate gears are three identical involute straight gears, and the A-type intermediate gears and the B-type intermediate gears have an equal number of teeth. The three A-type intermediate gears are meshed with the three B-type intermediate gears to form three gear pairs. The three gear pairs are embedded into three gaps, corresponding to the outer contours of the gear pairs, on the housing. The oscillating gear A and the output gear A are an internal cycloidal gear pair having a tooth difference of 2. The output gear A is an external gear. Each A-type intermediate gear is provided with an eccentric shaft extending axially at an end. The eccentric shafts on the three A-type intermediate gears are inserted into shaft holes on an end face of the oscillating gear A. The oscillating gear B and the output gear B are an internal cycloidal gear pair that has the same tooth shape and the same number of teeth as the oscillating gear A and the output gear A. The output gear B is an external gear. Each B-type intermediate gear is provided with an eccentric shaft extending axially at an end. The eccentric shafts on the three B-type intermediate gears are inserted into shaft holes on an end face of the oscillating gear B, respectively. Shaft holes with splines are formed at centers of the output gear A and the output gear B. As shown in FIG. 7 and FIG. 8, the housing is a member consisting of three components, and is assembled and fixed by screws. The housing is further provided with mounting holes for mounting external gears.

Embodiment 5: In this embodiment, considering that the torque is output to front and rear shafts disproportionally when the differential is used as a central differential, the unequal distribution of the torque is realized by using different tooth differences of the oscillating gears. For example, the A-type intermediate gears are three identical involute straight gears, the B-type intermediate gears are three identical involute straight gears, and the A-type intermediate gears and the B-type intermediate gears have an equal number of teeth. The three A-type intermediate gears are meshed with the three B-type intermediate gears to form three gear pairs. The oscillating gear A and the output gear A are an internal cycloidal gear pair having a tooth difference of 2. The output gear A is an external gear. Each A-type intermediate gear is provided with shafts at two ends and provided with an eccentric shaft extending axially at an end. The eccentric shafts on the three A-type intermediate gears are inserted into shaft holes on an end face of the oscillating gear A. The oscillating gear B and the output gear B are an internal cycloidal gear pair having a tooth difference of 3. The output gear B is an external gear. Each B-type intermediate gear is provided with shafts at two ends and provided with an eccentric shaft extending axially at an end. The eccentric shafts on the three B-type intermediate gears are inserted into shaft holes on an end face of the oscillating gear B, respectively. Shaft holes with splines are formed at centers of the output gear A and the output gear B. The housing is a member consisting of four components, and is assembled and fixed by screws. The housing is provided with shaft holes for connecting the shafts at two ends of the intermediate gear. A coaxial spline hole for connecting an input torque through a shaft is further formed at the center of the housing (the differential structure in this embodiment is basically the same as that in Embodiment 3, except that the tooth difference between the oscillating gear B and the output gear B is set as 3).

Figure 9:
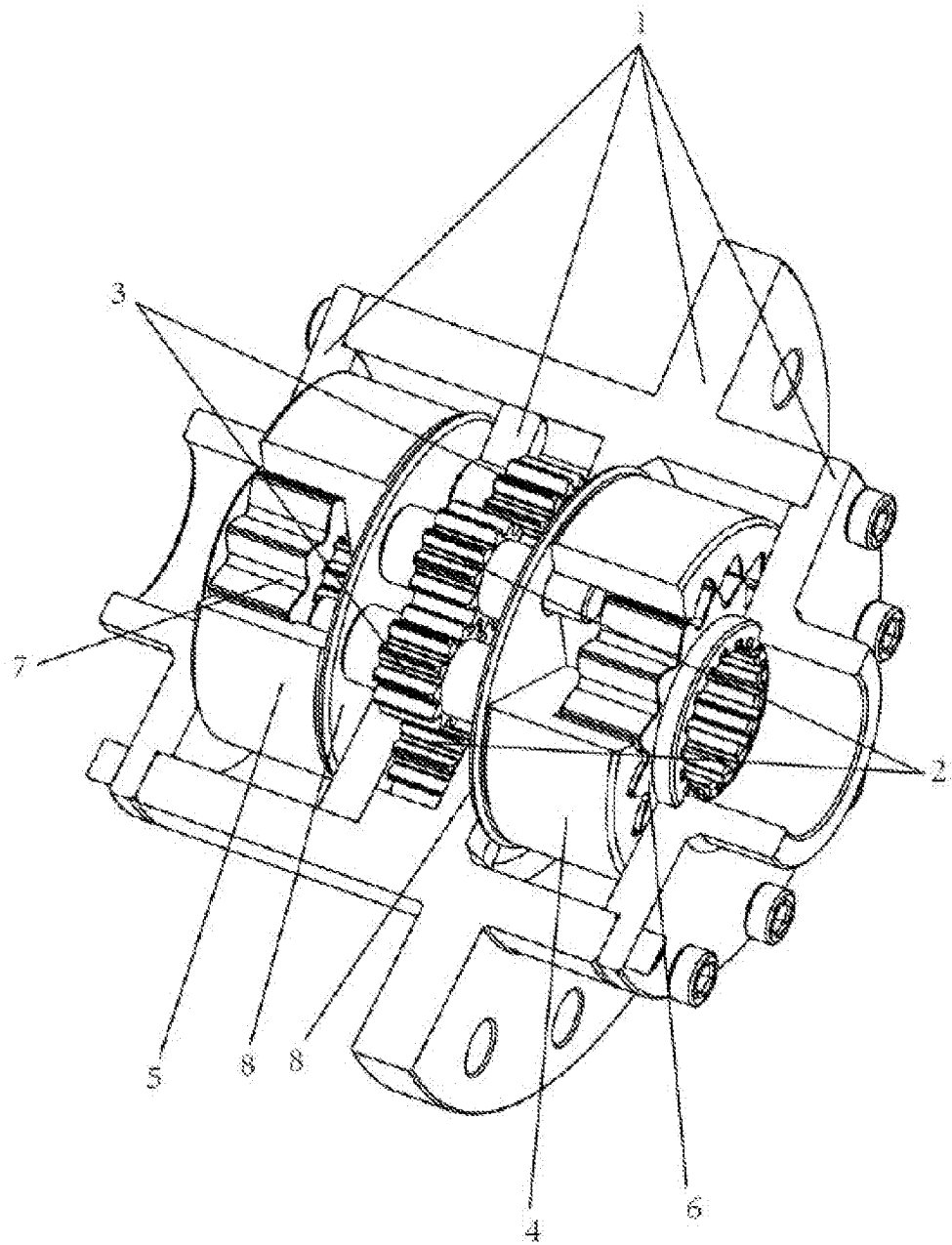
FIG. 9 is a sectional view showing the schematic structure of a limited slip differential in Embodiment 6.
Figure 10:
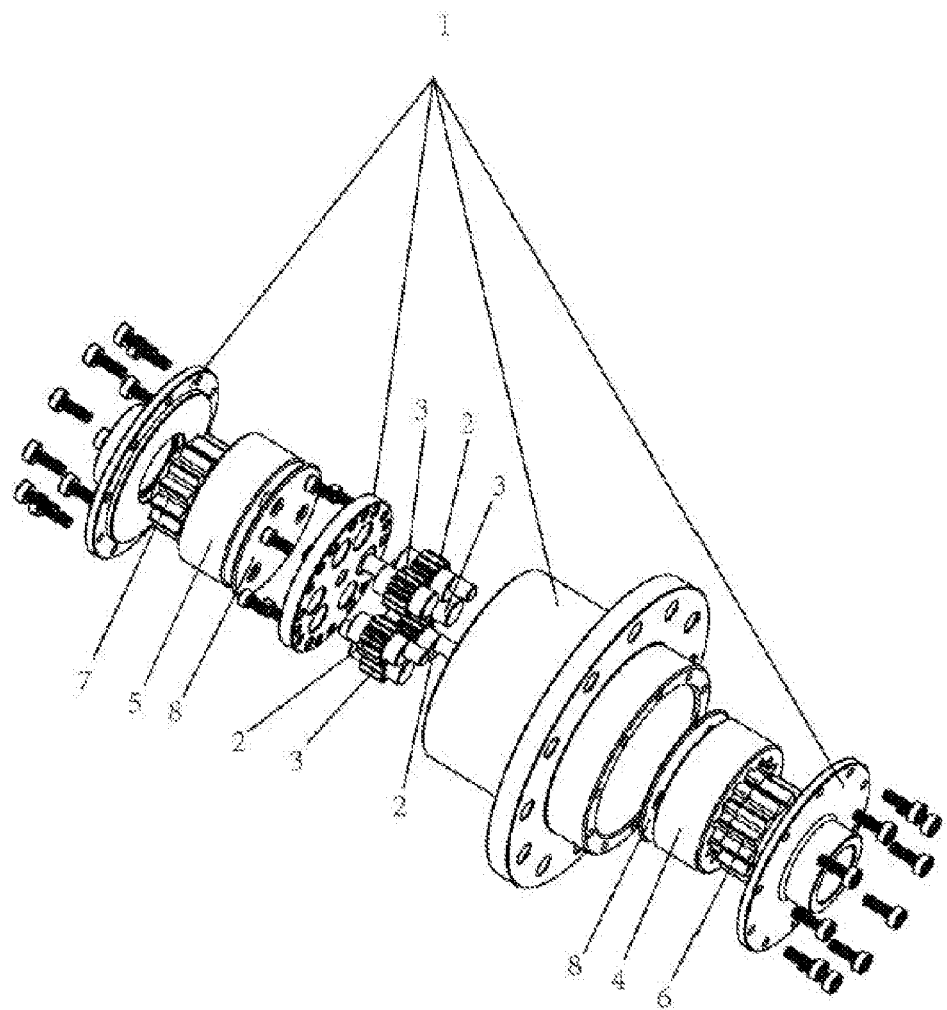
FIG. 10 is an exploded view of components of the limited slip differential in Embodiment 6.

Embodiment 6: As shown in FIG. 9 and FIG. 10, in this embodiment, the A-type intermediate gears are three identical involute straight gears, the B-type intermediate gears are three identical involute straight gears, and the A-type intermediate gears and the B-type intermediate gears have an equal number of teeth. The three A-type intermediate gears are meshed with the three B-type intermediate gears to form three gear pairs. The oscillating gear A and the output gear A are an internal cycloidal gear pair having a tooth difference of 2. The output gear A is an external gear. Each A-type intermediate gear is provided with shafts at two ends and provided with an eccentric shaft extending axially at an end. The eccentric shafts on the three A-type intermediate gears are inserted into shaft holes on an end face of the oscillating gear A. The oscillating gear B and the output gear B are an internal cycloidal gear pair that has the same tooth shape and the same number of teeth as the oscillating gear A and the output gear A. The output gear B is an external gear. Each B-type intermediate gear is provided with shafts at two ends and provided with an eccentric shaft extending axially at an end. The eccentric shafts on the three B-type intermediate gears are inserted into shaft holes on an end face of the oscillating gear B, respectively. Shaft holes with splines are formed at centers of the output gear A and the output gear B. Two friction plates made of a copper-based powder metallurgy material are arranged between the oscillating gear A and the A-type intermediate gears and between the oscillating gear B and the B-type intermediate gears, respectively. As shown in FIG. 9 and FIG. 10, the housing is a member consisting of four components, and is assembled and fixed by screws. The housing is provided with shaft holes for connecting the shafts at two ends of the intermediate gear. The housing is further provided with mounting holes for mounting external gears.

Embodiment 7: As shown in FIG. 11, FIG. 12 and FIG. 13, in this embodiment, the planet carrier consists of two planet carrier components with external splines. The A-type planet gears are three identical involute straight gears, the B-type planet gears are three identical involute straight gears, and the A-type planet gears and the B-type planet gears have an equal number of teeth. The three A-type planet gears are meshed with the three B-type planet gears to form three gear pairs. The A-type planet gears and the B-type planet gears are planet gears including crank shafts with two levels of crank throws. The implementation method is as follows: an eccentric shaft sleeve with a phase difference of 180 degrees is mounted on a flat output shaft of a gear component of each planet gear member to form two levels of crank throws of the crank shaft, and the eccentric shaft sleeve and the gear are assembled together to form a planet gear member. In this embodiment, two A-type oscillating gears with 32 teeth and an output gear A with 34 teeth are used to form an internal cycloidal gear pair having a tooth difference of 2. The output gear A is an internal gear. Two levels of crank throws formed by the eccentric shaft sleeve on each A-type planet gear are embedded into different shaft holes on the two A-type oscillating gears, respectively. In this embodiment, two B-type oscillating gears with 32 teeth and an output gear B with 34 teeth are used to form an internal cycloidal gear pair having a tooth difference of 2. The output gear B is an internal gear. Two levels of crank throws formed by the eccentric shaft sleeve on each B-type planet gear are embedded into different shaft holes on the two B-type oscillating gears, respectively. Shaft holes with splines are formed at centers of the output gear A and the output gear B. The housing is provided with internal splines corresponding to the splines on the planet carrier. Limiting components at two ends of the main body of the housing forms a housing member through threads and fixation screws. The components in the housing of the differential are limited at corresponding positions by the housing. The housing is provided with a screw hole for connecting a torque input gear. In this embodiment, except that the eccentric shaft sleeve is made of a tin bronze alloy, other components are made of chrome molybdenum steel.

Embodiment 8: As shown in FIG. 14 and FIG. 15, in this embodiment, the planet carrier consists of two planet carrier components with external splines. The A-type planet gears are three identical involute straight gears, the B-type planet gears are three identical involute straight gears, and the A-type planet gears and the B-type planet gears have an equal number of teeth. The three A-type planet gears are meshed with the three B-type planet gears to form three gear pairs. The A-type planet gears and the B-type planet gears are planet gears including crank shafts with two levels of crank throws. The implementation method is as follows: an eccentric shaft sleeve with a phase difference of 180 degrees is mounted on a flat output shaft of a gear component of each planet gear member to form two levels of crank throws of the crank shaft, and the eccentric shaft sleeve and the gear are assembled together to form a planet gear member. In this embodiment, two A-type oscillating gears with 32 teeth and an output gear A with 34 teeth are used to form an internal cycloidal gear pair having a tooth difference of 2. The output gear A is an internal gear. Two levels of crank throws formed by the eccentric shaft sleeve on each A-type planet gear are embedded into different shaft holes on the two A-type oscillating gears, respectively. A friction plate is arranged between the A-type oscillating gears and the planet carrier. In this embodiment, two B-type oscillating gears with 32 teeth and an output gear B with 34 teeth are used to form an internal cycloidal gear pair having a tooth.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A differential, comprising:
  a housing;
  an internal gear pair consisting of an oscillating gear A and an output gear A;
  an internal gear pair consisting of an oscillating gear B and an output gear B;
  at least two A-type intermediate gears;
  and at least two B-type intermediate gears;
  each A-type intermediate gear being radially fixed to the housing, and an axis of each A-type intermediate gear being parallel to an axis of rotation of the housing; each A-type intermediate gear being meshed with at least one B-type intermediate gear, and the gear ratio of each gear pair consisting of an A-type intermediate gear and a B-type intermediate gear being the same; each A-type intermediate gear being provided with an eccentric shaft having an axis parallel to its axis of rotation, and the eccentric shaft on each A-type intermediate gear having the same distance from the axis of rotation of the gear;
  the eccentric shafts on all A-type intermediate gears being the same in phase, and the eccentric shaft on each A-type intermediate gear being radially fixed to the oscillating gear A, respectively;
  the output gear A being coaxial with the axis of rotation of the housing;
  each B-type intermediate gear being radially fixed to the housing, and an axis of rotation of each B-type intermediate gear being parallel to the axis of rotation of the housing; each B-type intermediate gear being meshed with at least one A-type intermediate gear; each B-type intermediate gear being provided with an eccentric shaft having an axis parallel to its axis of rotation; and the eccentric shaft on each B-type intermediate gear having the same distance from the axis of rotation of the gear;
  the eccentric shafts on all B-type intermediate gears being the same in phase, and the eccentric shaft on each B-type intermediate gear being radially fixed to the oscillating gear B, respectively; and,
  the output gear B being coaxial with the axis of rotation of the housing.

2. The differential according to claim 1, wherein the housing rotates under an external force so as to drive each A-type intermediate gear and each B-type intermediate gear to revolve about the axis of rotation of the housing along with the housing; the eccentric shaft on each A-type intermediate gear drives the oscillating gear A to rotate with the housing, and the oscillating gear A drives the output gear A to rotate; the eccentric shaft on each B-type intermediate gear drives the oscillating gear B to rotate with the housing, and the oscillating gear B drives the output gear B to rotate; the output gear A and the output gear B output rotation, respectively; when the output gear A and the output gear B are the same in rotation speed, all components in the differential are stationary relative to the housing; when the output gear A and the output gear B are different in rotation speed due to different output loads, the output gear A and the output gear B rotate relative to each other, that is, the output gear A and the output gear B rotate relative to the housing in opposite directions, respectively, so that the oscillating gear A and the oscillating gear B revolve relative to the housing in a direction opposite to the direction of the axis of rotation of the housing; the revolution of the oscillating gear A and the oscillating gear B relative to the axis of rotation of the housing drives each A-type intermediate gear and each B-type intermediate gear to rotate in opposite directions through the eccentric shafts; and, due to the limitation of the meshing of the A-type intermediate gears with the B-type intermediate gears, the output gear A and the output gear B can only rotate in opposite directions relative to the housing at a fixed rotation speed ratio.

3. The differential according to claim 1, wherein the gear pair consisting of the oscillating gear A and the output gear A or the gear pair consisting of the oscillating gear B and the output gear B is a cycloidal gear pair.

4. The differential according to claim 1, wherein the output gear A, the output gear B, the oscillating gear A and the oscillating gear B are axially fixed relative to the housing, respectively.

5. The differential according to claim 1, wherein the A-type intermediate gears and the B-type intermediate gears are axially fixed relative to the housing.

6. The differential according to claim 1, wherein the housing of the differential further comprises a gear or spline or screw hole for being in mechanical connection to a torque input component; and, each of the output gear A and the output gear B further comprises a gear or spline for being in mechanical connection to a torque output load.

7. A differential, comprising:
a housing;
an internal gear pair consisting of an oscillating gear A and an output gear A;
an internal gear pair consisting of an oscillating gear B and an output gear B;
at least two A-type intermediate gears;
at least two B-type intermediate gears; and
at least two friction plates;
each A-type intermediate gear being radially fixed to the housing, and an axis of rotation of each A-type intermediate gear being parallel to an axis of rotation of the housing; each A-type intermediate gear being meshed with at least one B-type intermediate gear, and the gear ratio of each gear pair consisting of an A-type intermediate gear and a B-type intermediate gear being the same; each A-type intermediate gear being provided with an eccentric shaft having an axis parallel to its axis of rotation, and the eccentric shaft on each A-type intermediate gear having the same distance from the axis of rotation of the gear;
the eccentric shafts on all A-type intermediate gears being the same in phase, and the eccentric shaft on each A-type intermediate gear being radially fixed to the oscillating gear A, respectively;
the output gear A being coaxial with the axis of rotation of the housing;
a friction plate being arranged between each A-type intermediate gear and the oscillating gear A or the housing;
each B-type intermediate gear being radially fixed to the housing, and an axis of rotation of each B-type intermediate gear being parallel to an axis of rotation of the housing; each B-type intermediate gear being meshed with at least one A-type intermediate gear; each B-type intermediate gear being provided with an eccentric shaft having an axis parallel to its axis of rotation, and the eccentric shaft on each B-type intermediate gear having the same distance from the axis of rotation of the gear; the eccentric shafts on all B-type intermediate gears being the same in phase, and the eccentric shaft on each B-type intermediate gear being radially fixed to the oscillating gear B, respectively;
the output gear B being coaxial with the axis of rotation of the housing; and,
a friction plate being arranged between each B-type intermediate gear and the oscillating gear B or the housing.

8. The differential according to claim 7, wherein the gear pair consisting of the oscillating gear A and the output gear A or the gear pair consisting of the oscillating gear B and the output gear B is a cycloidal gear pair.

9. The differential according to claim 7, wherein the output gear A, the output gear B, the oscillating gear A and the oscillating gear B are axially fixed relative to the housing, respectively.

10. The differential according to claim 7, wherein the A-type intermediate gears and the B-type intermediate gears are axially fixed relative to the housing.

11. The differential according to claim 7, wherein the housing of the differential further comprises a gear or spline or screw hole for being in mechanical connection to a torque input component; and, each of the output gear A and the output gear B further comprises a gear or spline for being in mechanical connection to a torque output load.

12. A cycloidal differential, comprising:
a planet carrier;
at least two A-type planet gears each having a crank shaft at an end;
at least two B-type planet gears each having a crank shaft at an end;
at least one A-type oscillating gear;
an output gear A;
at least one B-type oscillating gear; and
an output gear B;
an axis of rotation of each A-type planet gear being fixed on the planet carrier, the axis of rotation of each A-type planet gear being parallel to an axis of rotation of the planet carrier, and each A-type planet gear being meshed with at least one B-type planet gear; an axis of a journal of a same-level crank throw of the crank shaft on each A-type planet gear being parallel to the axis of rotation of the gear and having the same distance from the axis of rotation of the gear; the crank shafts on all A-type planet gears being the same in phase, and the journal of the same-level crank throw on each A-type planet gear passing through each shaft hole on a same A-type oscillating gear;
a rotation shaft of the output gear A being coaxial with a rotation shaft of the planet carrier, and the output gear A being meshed with each A-type oscillating gear to form an internal gear pair;
each A-type oscillating gear having a same tooth contour and an equal number of teeth;
an axis of rotation of each B-type planet gear being fixed on the planet carrier, the axis of rotation of each B-type planet gear being parallel to the axis of rotation of the planet carrier, and each B-type planet gear being meshed with at least one A-type planet gear; an axis of a journal of a same-level crank throw of the crank shaft on each B-type planet gear being parallel to the axis of rotation of the gear and has the same distance from the axis of rotation of the gear; the crank shafts on all B-type planet gears being the same in phase, and the journal of the same-level crank throw on each B-type planet gear passing through each shaft hole on a same B-type oscillating gear; a rotation shaft of the output gear B being coaxial with a rotation shaft of the planet carrier, and the output gear B being meshed with each B-type oscillating gear to form an internal gear pair;
each B-type oscillating gear having a same tooth contour and an equal number of teeth; each A-type planet gear and each B-type planet gear having the same gear ratio; and, key grooves or holes for connecting components outside the differential being formed on the planet carrier, the output gear A and the output gear B, respectively.

13. The cycloidal differential according to claim 12, wherein the planet carrier rotates under an external force through the key groove or hole to drive each A-type planet gear and each B-type planet gear to revolve with the rotation of the planet carrier; the crank shaft on each A-type planet gear drives all A-type oscillating gears to rotate with the planet carrier, and all A-type oscillating gears drive the output gear A to rotate; the crank shaft on each B-type planet gear drives all B-type oscillating gears to rotate with the planet carrier, and all B-type oscillating gears drive the output gear B to rotate; the output gear A and the output gear B output rotate through key grooves or holes, respectively; when the output gear A and the output gear B are the same in rotation speed, all components in the differential are stationary relative to the planet carrier; when the output gear A and the output gear B are different in rotation speed due to different output loads, the output gear A and the output gear B rotate relative to each other, that is, the output gear A and the output gear B rotate relative to the planet carrier in opposite directions, respectively, so that all oscillating gears A and all oscillating gears B revolve relative to the planet carrier in a direction opposite to the direction of the axis of rotation of the planet carrier, respectively; the revolution of each oscillating gear A and each oscillating gear B relative to the axis of rotation of the planet carrier drives each A-type planet gear and each B-type planet gear to rotate in opposite directions through the crank shafts; and, due to the limitation of the meshing of the A-type planet gears with the B-type planet gears, the output gear A and the output gear B can only rotate in opposite directions relative to the planet carrier at a fixed rotation speed ratio.

14. The cycloidal differential according to claim 12, wherein the gear pair consisting of the A-type oscillating gear and the output gear A or the gear pair consisting of the B-type oscillating gear and the output gear B is a cycloidal gear pair.

15. The cycloidal differential according to claim 12, wherein both the A-type planet gears and the B-type planet gears are helical gears or worms.

16. The cycloidal differential according to claim 12, wherein the differential comprises two A-type oscillating gears having a revolution phase difference of 180 degrees or two B-type oscillating gears having a revolution phase difference of 180 degrees.

17. The cycloidal differential according to claim 12, wherein at least one limiting structure is arranged on the planet carrier, and the limiting structure radially limits the output gear A and the output gear B, axially limits the output gear A and the output gear B and axially limits the A-type planet gears and the B-type planet gears.

18. The cycloidal differential according to claim 12, wherein the differential further comprises a housing which is circumferentially fixed to the planet carrier, and a key groove or hole for connecting a component outside the differential or a gear meshed with a component outside the differential is provided on the housing.

19. A cycloidal differential, comprising:
a planet carrier;
at least two A-type planet gears each having a crank shaft at an end;
at least two B-type planet gears each having a crank shaft at an end;
two A-type oscillating gears;
an output gear A;
two B-type oscillating gears; and
an output gear B;
an axis of rotation of each A-type planet gear being fixed on the planet carrier, the axis of rotation of each A-type planet gear being parallel to an axis of rotation of the planet carrier, and each A-type planet gear being meshed with at least one B-type planet gear; the crank shaft on each A-type planet gear being provided with a two-stage eccentric shaft, and a phase difference of the two-stage eccentric shaft being 180 degrees; axes of the eccentric shafts of the crank shafts on all A-type planet gears being parallel to the axes of rotation of the planet gears and having a same eccentric distance; the crank shafts on all A-type planet gears being the same in phase, and the two-stage eccentric shaft on each A-type planet gear passing through corresponding shaft holes on the two A-type oscillating gears, respectively; an axis of rotation of the output gear A being coaxial with the axis of rotation of the planet carrier, and the output gear A being meshed with the two A-type oscillating gears to form an internal gear pair, respectively;
the two A-type oscillating gear having a same tooth contour and an equal number of teeth;
an axis of rotation of each B-type planet gear being fixed on the planet carrier, the axis of rotation of each B-type planet gear being parallel to the axis of rotation of the planet carrier, and each B-type planet gear being meshed with at least one A-type planet gear; the crank shaft on each B-type planet gear being provided with a two-stage eccentric shaft, and a phase difference of the two-stage eccentric shaft being 180 degrees; axes of the eccentric shafts of the crank shafts on all B-type planet gears being parallel to the axes of rotation of the planet gears and having a same eccentric distance; the crank shafts on all B-type planet gears being the same in phase, and the two-stage eccentric shaft on each B-type planet gear passing through corresponding shaft holes on the two B-type oscillating gears, respectively;
an axis of rotation of the output gear B being coaxial with the axis of rotation of the planet carrier, and the output gear B being meshed with the two B-type oscillating gears to form an internal gear pair, respectively;
the two B-type oscillating gear having a same tooth contour and an equal number of teeth;
each A-type planet gear and each B-type planet gear having the same gear ratio; and,
toothed structures or hole structures for connecting components outside the differential being formed on the planet carrier, the output gear A and the output gear B, respectively.

20. A cycloidal differential, comprising:
a planet carrier;
at least two A-type planet gears each having a crank shaft at an end;
at least two B-type planet gears each having a crank shaft at an end;
two A-type oscillating gears;
an output gear A;
two B-type oscillating gears;
an output gear B;
and at least two friction plates;
an axis of rotation of each A-type planet gear being fixed on the planet carrier, the axis of rotation of each A-type planet gear being parallel to an axis of rotation of the planet carrier, and each A-type planet gear being meshed with at least one B-type planet gear; the crank shaft on each A-type planet gear being provided with a two-stage eccentric shaft, and a phase difference of the two-stage eccentric shaft being 180 degrees; axes of the eccentric shafts of the crank shafts on all A-type planet gears being parallel to the axes of rotation of the planet gears and having a same eccentric distance; the crank shafts on all A-type planet gears being the same in phase, and the two-stage eccentric shaft on each A-type planet gear passing through corresponding shaft holes on the two A-type oscillating gears, respectively;

an axis of rotation of the output gear A being coaxial with the axis of rotation of the planet carrier, and the output gear A being meshed with the two A-type oscillating gears to form an internal gear pair, respectively;

the two A-type oscillating gear having a same tooth contour and an equal number of teeth; friction plates being arranged between the A-type oscillating gears and other components;

an axis of rotation of each B-type planet gear being fixed on the planet carrier, the axis of rotation of each B-type planet gear being parallel to the axis of rotation of the planet carrier, and each B-type planet gear being meshed with at least one A-type planet gear; the crank shaft on each B-type planet gear being provided with a two-stage eccentric shaft, and a phase difference of the two-stage eccentric shaft being 180 degrees; axes of the eccentric shafts of the crank shafts on all B-type planet gears being parallel to the axes of rotation of the planet gears and having a same eccentric distance; the crank shafts on all B-type planet gears being the same in phase, and the two-stage eccentric shaft on each B-type planet gear passing through corresponding shaft holes on the two B-type oscillating gears, respectively;

an axis of rotation of the output gear B being coaxial with the axis of rotation of the planet carrier, and the output gear B being meshed with the two B-type oscillating gears to form an internal gear pair, respectively;

the two B-type oscillating gear having a same tooth contour and an equal number of teeth;

friction plates being arranged between the B-type oscillating gears and other components;

each A-type planet gear and each B-type planet gear having the same gear ratio; and, toothed structures or hole structures for connecting components outside the differential being formed on the planet carrier, the output gear A and the output gear B, respectively.

* * * * *